(12) United States Patent
Quazi

(10) Patent No.: US 7,541,791 B2
(45) Date of Patent: Jun. 2, 2009

(54) SWITCH MODE POWER CONVERTER HAVING MULTIPLE INDUCTOR WINDINGS EQUIPPED WITH SNUBBER CIRCUITS

(75) Inventor: Fazle S. Quazi, Boulder, CO (US)

(73) Assignee: Energy Conservation Technologies, Inc., Boulder, CO (US)

(*) Notice: Subject to any disclaimer, the term of this patent is extended or adjusted under 35 U.S.C. 154(b) by 169 days.

(21) Appl. No.: 11/508,614

(22) Filed: Aug. 23, 2006

(65) Prior Publication Data

US 2007/0216385 A1 Sep. 20, 2007

Related U.S. Application Data

(63) Continuation-in-part of application No. 11/375,558, filed on Mar. 14, 2006.

(51) Int. Cl.
*G05F 1/00* (2006.01)

(52) U.S. Cl. ............ 323/282; 363/56.12; 363/89

(58) Field of Classification Search ............ 363/55, 363/56.12, 89; 323/282
See application file for complete search history.

(56) References Cited

U.S. PATENT DOCUMENTS

| | | | |
|---|---|---|---|
| 4,511,823 A | 4/1985 | Eaton et al. | |
| 4,864,482 A | 9/1989 | Quazi et al. | |
| 5,258,902 A * | 11/1993 | Lindbery et al. | ......... 363/56.12 |
| 5,289,083 A | 2/1994 | Quazi | |
| 5,434,767 A * | 7/1995 | Batarseh et al. | ............ 363/16 |
| 5,636,106 A * | 6/1997 | Batarseh et al. | ............ 363/16 |
| 5,726,869 A * | 3/1998 | Yamashita et al. | ....... 363/21.06 |
| 5,742,146 A * | 4/1998 | Langhorst | ............ 318/701 |
| 5,818,707 A | 10/1998 | Seong et al. | |
| 5,995,398 A | 11/1999 | Yamauchi et al. | |
| 6,031,734 A * | 2/2000 | Hermann et al. | ............ 363/19 |
| 6,069,811 A * | 5/2000 | Moriguchi et al. | ......... 363/142 |
| 6,075,715 A | 6/2000 | Maehara et al. | |
| 6,118,225 A | 9/2000 | Wessels et al. | |
| 6,188,183 B1 * | 2/2001 | Greenwood et al. | ......... 315/307 |
| 6,272,027 B1 | 8/2001 | Fraidlin et al. | |
| 6,359,395 B1 | 3/2002 | Quazi et al. | |
| 6,448,744 B1 | 9/2002 | Malik et al. | |
| 6,487,098 B2 | 11/2002 | Malik et al. | |
| 6,798,670 B2 * | 9/2004 | King | ............ 363/17 |
| 7,262,980 B2 * | 8/2007 | Phadke et al. | ............ 363/89 |
| 2001/0011880 A1 * | 8/2001 | James | ............ 320/104 |
| 2002/0031000 A1 * | 3/2002 | Sakai et al. | ............ 363/65 |
| 2003/0117818 A1 * | 6/2003 | Ota | ............ 363/47 |
| 2003/0222627 A1 | 12/2003 | Hwang | |
| 2005/0117372 A1 * | 6/2005 | Caron | ......... 363/56.12 |

* cited by examiner

*Primary Examiner*—Akm E Ullah
*Assistant Examiner*—Arun Williams
(74) *Attorney, Agent, or Firm*—Patton Boggs LLP

(57) ABSTRACT

The present switch mode power converter having multiple inductor windings equipped with snubber circuits uses a small value inductor that has at least one properly oriented secondary winding, and ultra fast diodes interconnect the primary and the secondary windings of this inductor for providing protection against momentary short circuits, reductions of dv/dt, and switching losses.

24 Claims, 23 Drawing Sheets

US 7,541,791 B2

SWITCH MODE POWER CONVERTER HAVING MULTIPLE INDUCTOR WINDINGS EQUIPPED WITH SNUBBER CIRCUITS

CROSS-REFERENCE TO RELATED APPLICATIONS

This Application is a continuation-in-part of U.S. patent application Ser. No. 11/375,558 filed on Mar. 14, 2006.

FIELD OF THE INVENTION

This invention relates to single stage power conversion circuitry used in switch mode inverters and power converters.

BACKGROUND OF THE INVENTION

For increased efficiency and size reductions, switch mode power converters and inverters use high frequency switching techniques for power conversions. However, high frequency switching of power switches creates many undesirable circuit behaviors such as switch turn-on and turn-off losses, high voltage switching transient noise, and momentary short circuits of power switches. The results are often catastrophic, such as device failures, excessive heat generation within the power devices, and unwanted electromagnetic interference (EMI). Solutions to these problems are complex and often at the expense of reduced power conversion efficiency, increased size, and cost.

Turn-off related switching loss and dv/dt reductions are often interrelated and relatively easier to control by means of passive and active snubber circuits. Active snubbers are expensive, cumbersome, and difficult to implement. On the other hand, popular passive snubber schemes such as Resistor-Capacitor-Diode (RCD) snubbers waste significant energy, causing reduced power conversion efficiency and increased heat generation. Nonetheless, additional circuit solutions in conjunction with turn-off snubbers must be found in order to address the other undesirable features of switch mode power supplies.

BRIEF SUMMARY OF THE INVENTION

The present switch mode power converter having multiple inductor windings equipped with snubber circuits provides substantially complete, efficient, and economical solutions to the above problems by means of a small value inductor that has at least one properly oriented secondary winding. Further, properly placed ultra fast diodes interconnect the primary and the secondary windings of this inductor for providing protection against momentary short circuits, reduction of dv/dt, and switching losses.

These novel circuit schemes and their variations can be applied to various commonly used power conversion topologies, in particular, high frequency driven half and full bridge circuit topologies that are commonly used for power conversions for higher wattage DC-DC, DC-AC power supplies including fluorescent and HID electronic ballasts.

DETAILED DESCRIPTION OF THE INVENTION

Figure 1:
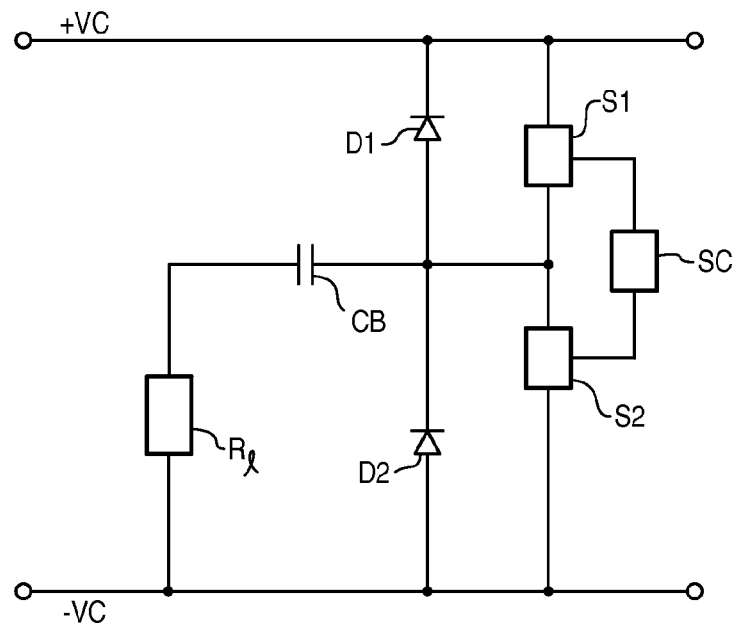
FIG. 1 illustrates in block diagram form a conventional half bridge switch mode power conversion topology.
Figure 2:
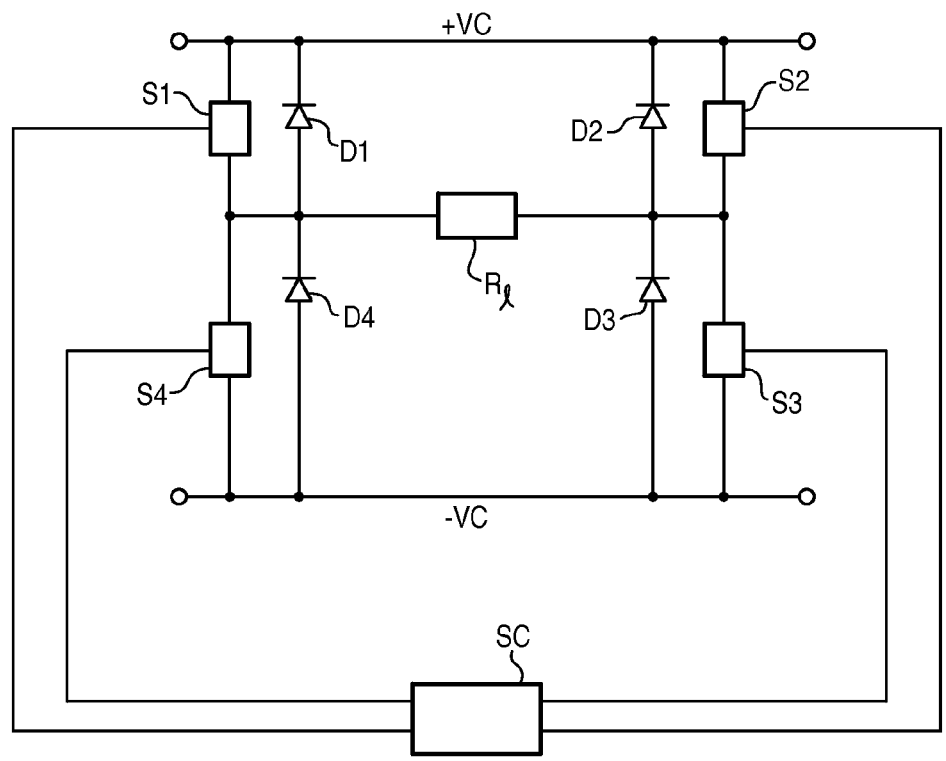
FIG. 2 illustrates in block diagram form a conventional full bridge switch mode power conversion topology.

The most popular switch mode power converter topologies are fly-back, buck, boost, forward, push-pull, half bridge, and full bridge power converters. Block diagrams of the two most commonly used topologies for high power applications are shown in FIGS. 1 and 2, where FIG. 1 is for a half bridge inverter and FIG. 2 is for a full bridge inverter. In FIG. 1, the semiconductor power switches S1 and S2 are alternately turned ON and OFF. A switch mode control circuit SC, such as model SG 2525 made by ST Microelectronics, governs the switching speeds, that is, the operating frequencies of the inverter and duty cycles. In FIG. 1, the capacitor CB is a DC blocking capacitor and $R_l$ is the switched load such as a resonant LC network or a transformer. The diodes D1 and D2 are commutating diodes. The full bridge inverter of FIG. 2 consists of four power switches S1-S4. The power switches S1 and S3 form the first pair and the power switches S2 and S4 form the second pair, whereby when the first switch pair is ON, the second switch pair is OFF. Similarly, when the second switch pair is ON, the first switch pair is OFF. Once again, the switch mode control circuit SC governs the switching speeds and duty cycles. The diodes D1-D4 are commutating diodes. The switched load is $R_l$. Further, the high side power switches can be driven by known isolation techniques, such as pulse transformer and optical based isolation, as well as level shift driver ICs made by such companies as International Rectifier and Fairchild Semiconductor.

For the purpose of the present disclosure, the half bridge circuit topology is primarily utilized. However, it is evident to anyone skilled in the art that the teachings of this disclosure can equally be applied to other switch mode power converter topologies.

Parasitic Impedances Found in Switch Mode Power Converters

Figure 3A:
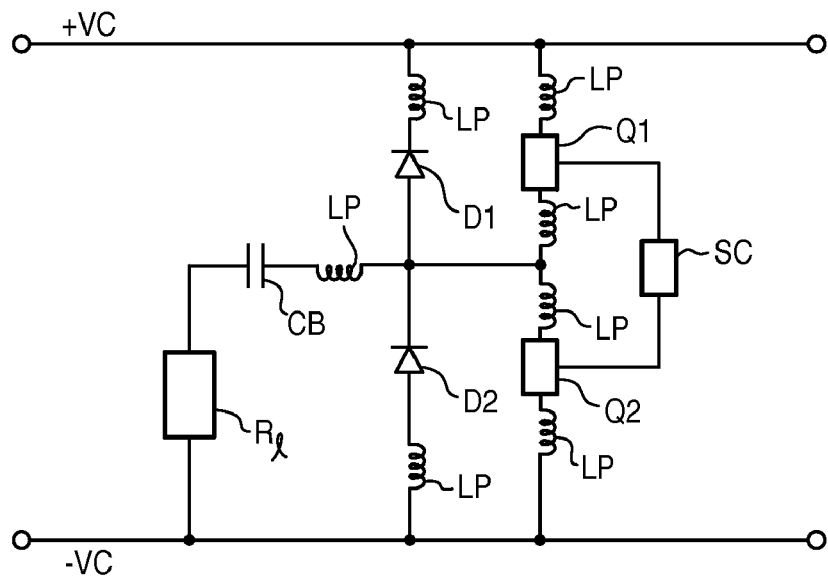
FIGS. 3A and 3B illustrate approximate locations of parasitic inductances in the conventional half bridge switch mode power conversion circuit of FIG. 1 and their effect in graphical form, respectively.

It is well known that any switch mode power converter circuit layout, including switching components, adds stray or parasitic inductances to the switching circuits. Approximate locations of these parasitic inductances, LP, in a half bridge inverter circuit layout are shown in FIG. 3A. Further, the following is a brief description of the circuit behavior within the switching cycles of power switches S1 and S2.

In FIG. 3A, when the power switch S1 turns ON, current starts to flow from the DC bus +VC through power switch S1 to the load $R_l$. At the instant that power switch S1 turns OFF and before power switch S2 turns ON, the voltage at the junction of power switches S1 and S2 reverses and starts to go negative. However, because of the diode D2, this voltage at the junction of power switches S1 and S2 is clamped approximately equal to −VC. However, since any diode has a finite amount of reverse recovery time (hereinafter $t_{rr}$), depending on the $t_{rr}$ of diode D2 and due to the presence of parasitic circuit inductances LP, the clamping voltage magnitude can easily be much lower than −VC. The more negative this clamping voltage, the greater the switching noise, that is, the greater the electromagnetic interference (EMI).

Figure 3B:
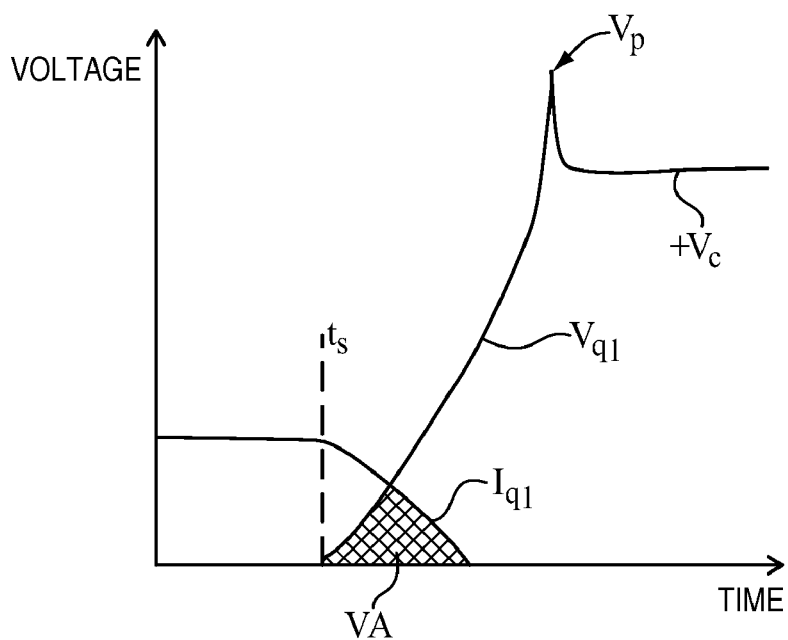

During this switching transition period, since any power switch also takes a finite amount of time to turn-off, the current $I_{S1}$ that was flowing through power switch S1 prior to turn-off starts to decrease while the voltage $V_{S1}$ across power switch S1 starts to rise. The rate at which this voltage rises is known as dv/dt. Further, depending on the actual turn-off time of power switch S1, this rising voltage and decreasing current intersect. The area under this intersection period is indicated by VA in the graph of FIG. 3B. This intersection period approximately determines the turn-off switching loss. This switching loss can be very significant and often causes device failures. Further, the higher the operating frequency, the greater the switching loss. Similarly, the faster the switch turn-off time, the voltage across power switch S1 also rises faster. As can be seen from FIG. 3B, the faster turn-off time is desirable in order to reduce the turn-off switching loss. However, the faster turn-off time causes higher voltage spikes, $V_p$, which are responsible for: 1) secondary breakdown of semiconductor power switches S1 and S2, and 2) turn-off related EMI. In FIG. 3B, the notation $t_s$ represents the time where the power switch S1 begins to turn OFF.

In practice, in order to avoid cross conduction between power switch S1 and power switch S2, a predetermined period of delay is set such that until one power switch completely turns OFF, the other power switch cannot turn ON. This delay is commonly known as "dead-time". Therefore, after power switch S1 turns OFF and following the dead-time period, when power switch S2 turns ON, current starts to flow into power switch S2. Further, since any power switch also has parasitic capacitances associated with it, for example, "Miller capacitance", at the instant power switch S2 turns ON, it discharges its parasitic capacitances as well as the parasitic capacitances that are associated with power switch S1. The discharge of these parasitic capacitances into the power switches is the primary cause of turn-on switching losses. However, usually the turn-on switching loss is much less than the turn-off switching loss.

At the instant power switch S2 turns OFF, it also suffers the similar switching loss, as was the case of power switch S1. The only difference is that, during the power switch S2 turn-off period, the voltage at the junction of power switch S1 and power switch S2 reverses to positive direction and gets clamped by diode D1 to +VC.

Depending on the output load characteristics and device operating frequency, there are certain situations whereby a power switch turns ON while the opposite commutating diode was still conducting. For example, in FIG. 3A, the power switch S1 turns ON while diode D2 was conducting. In this case, due to diode D2 reverse recovery related delay, power switch S1 experiences a temporary short circuit. This causes a large power spike in power switch S1 and diode D2 and may damage power switch S1 and also diode D2. Similarly, if diode D1 was conducting while power switch S2 turns ON, an identical situation occurs.

Figure 4A:
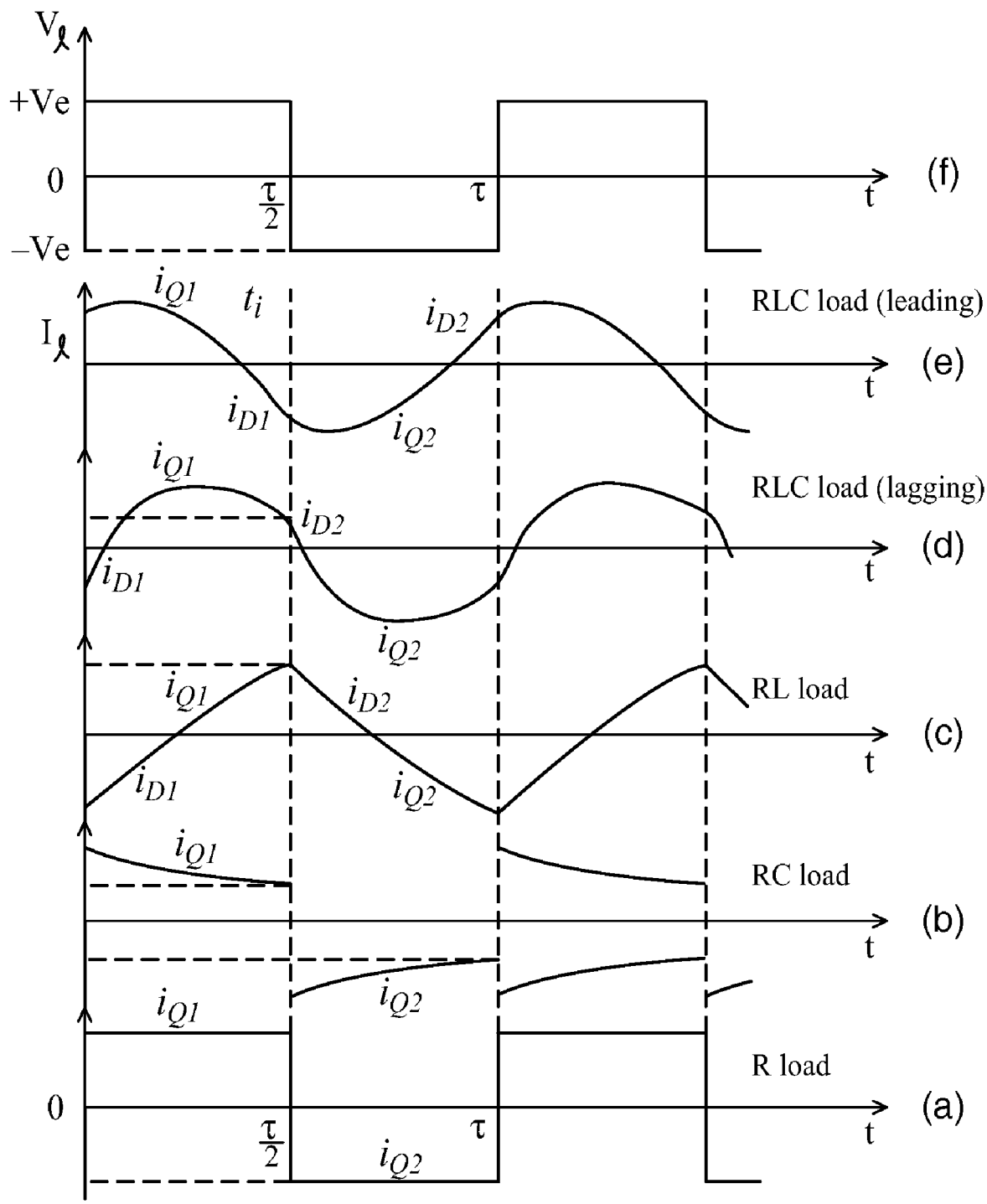
FIGS. 4A and 4B illustrate output load characteristics in relationship to turn-on and turn-off periods of power switches S1 and S2 in the conventional half bridge switch mode power conversion circuit of FIG. 1 and a graphical representation of their operation, respectively.

FIG. 4A illustrates, in graphical form, the output load characteristics in relationship to turn-on and turn-off periods of power switches S1 and S2. In this graph, Section (a) represents a resistive load R, Section (b) represents a resistive-capacitive load RC, Section (c) represents a resistive-inductive load RL, and Section (d) represents a resistive-inductive-capacitive load RLC, where all of these loads have lagging power factors; that is, the load current lags the switching voltage across a power switch. In this case, when the power switch S1 turns OFF, the load current commutes in the diode D2. The Section (f) represents the output load voltage $V_l$. At the instant when power switch S2 turns ON, the current is transferred from diode D2 to power switch S1. This transfer of current does not cause any problem, as diode D2 is essentially subjected to zero voltage.

Figure 4B:
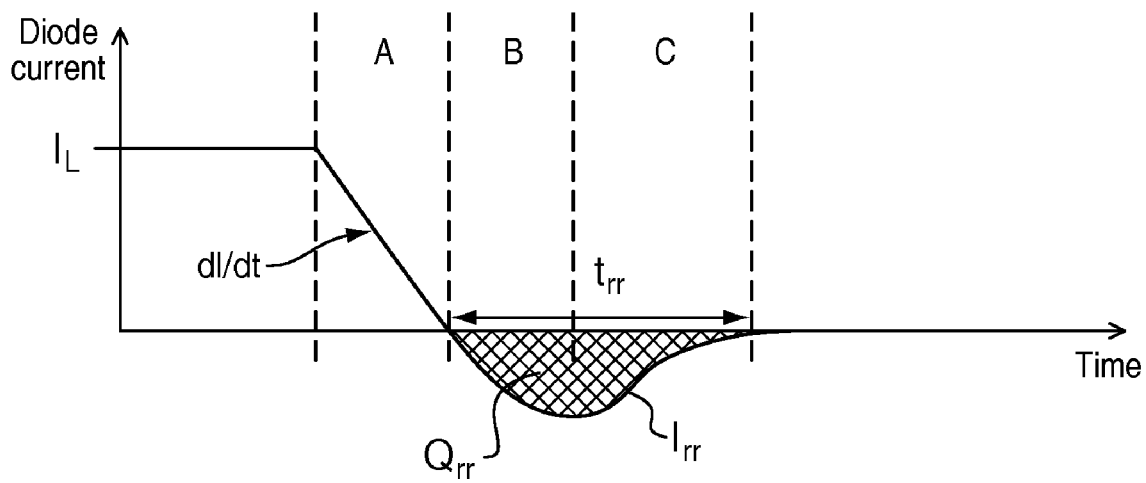

On the other hand, for a leading power factor type of load, that is, the load current leads the voltage, Section (e), during the power switch S1 turn-on period, for example, at some instant, $t_j$, the load current stops flowing into power switch S1 and reverses its direction while power switch S1 is still ON. At that instant, the load current starts to flow in diode D1. In other words, diode D1 provides the path for the reverse current to flow. Therefore, at the instant when power switch S1 turns OFF and power switch S2 turns ON, the current starts to flow in power switch S2 while current was still flowing in diode D1. This immediately causes a short between power switch S2 and diode D1. The short circuit duration is approximately equal to the $t_{rr}$ of diode D1. During this reverse recovery process, the current in diode D1 first falls to zero and continues to reverse to its peak value before reversing back to zero again. These three stages of current flow in diode D1 are shown respectively in regions A, B, and C of FIG. 4B. The short circuit current between power switch S2 and diode D1, the reverse peak current $I_{rr}$, and charge $Q_{rr}$ in diode D1 depend primarily on the DC bus voltage, load current, circuit parasitic inductances, and $t_{rr}$ characteristics of diode D1.

In addition to the leading power factor load current switching related shorts, momentary short circuits between power switch S1 and power switch S2 can also occur due to circuit transients. Excessive dv/dt and di/dt are primary causes for circuit transients. The circuit transient related simultaneous turn-on of power switch S1 and power switch S2 usually lasts for a short period of time; however, a direct short between power switch S1 and power switch S2 even for 50 nS can cause their destruction.

Conventional Resistor-Capacitor-Diode Snubber

Figure 5A:
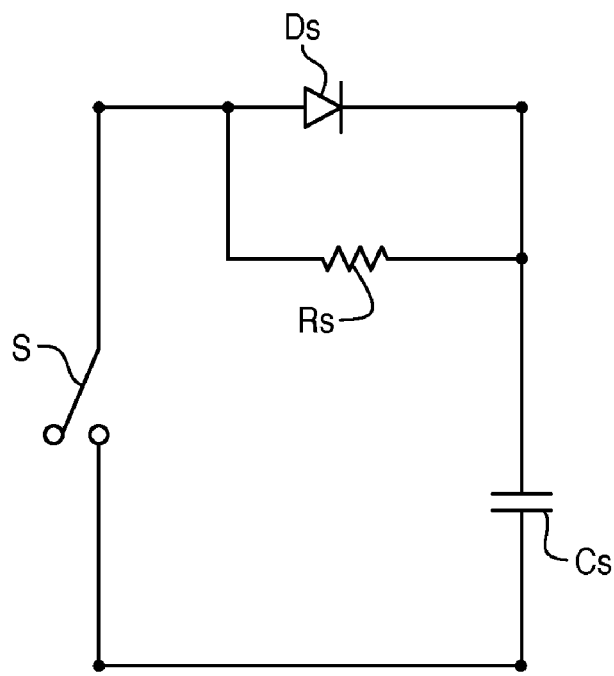
FIGS. 5A and 5B illustrate a typical RCD snubber and a prior art power switching circuit that uses a conventional RCD snubber, respectively.
Figure 5B:
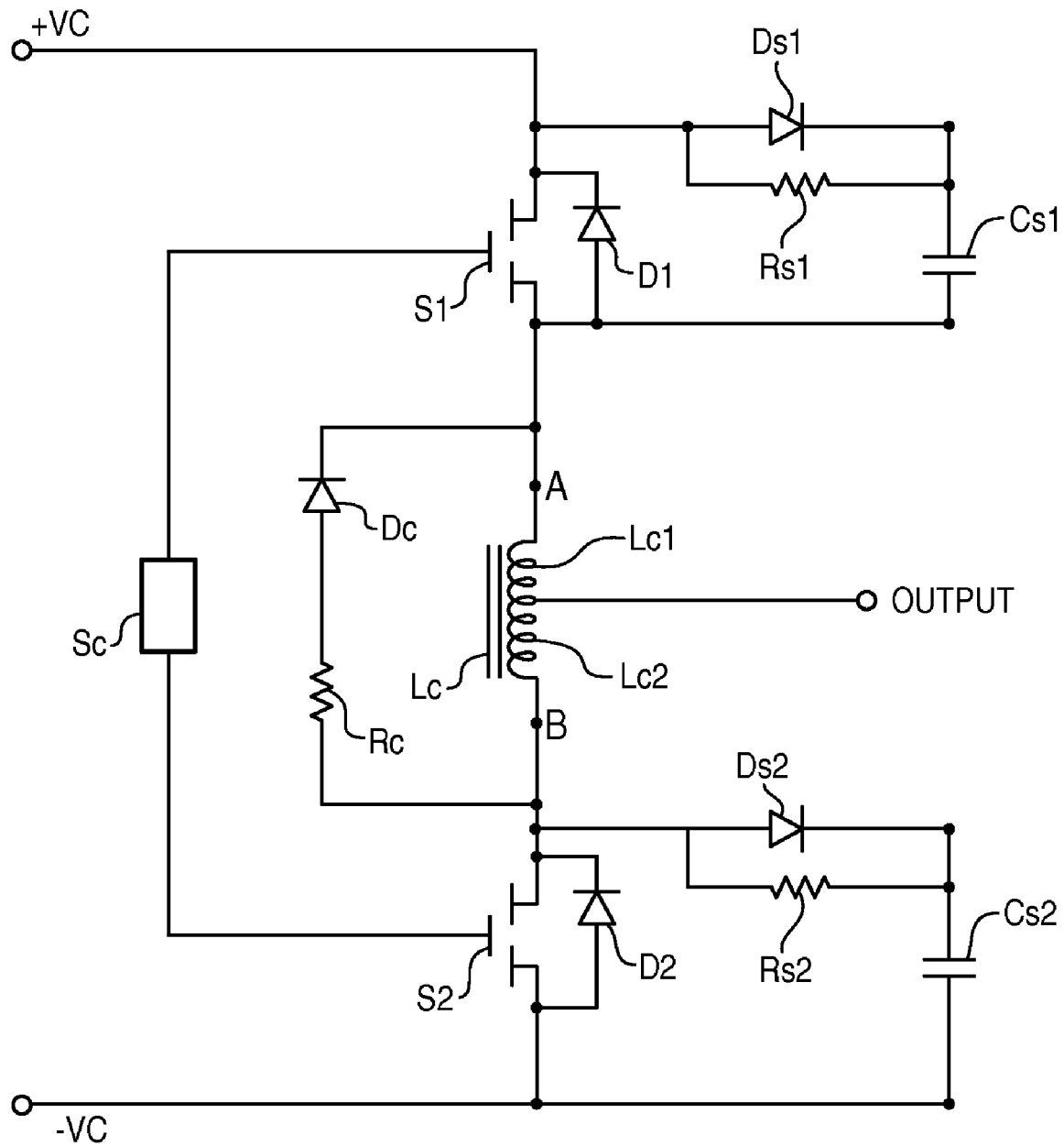

A solution for the above-described turn-on related switching loss and dv/dt reduction is described with respect to half-bridge power converter circuits. FIG. 5A is a prior art Resistor-Capacitor-Diode snubber circuit, and FIG. 5B illustrates how the reduction of the turn-on switching loss and the reduced rate of dv/dt can be achieved by the use of a conventional RCD snubber.

In the case shown in FIG. 5A, during the turn-off period, the previously discharged snubber capacitor Cs slows down the voltage rise across the power switch S. Depending on the value of capacitor Cs, the voltage across power switch S can be held to a lower value until current flow in power switch S completely stops. This substantially reduces switching loss and EMI. The primary disadvantage of an RCD snubber is the dissipations in resistor Rs. This can be explained as follows: during the turn-on period, capacitor Cs discharges into the power switch S. The resistor Rs limits this discharge current peak. Therefore, the energy stored into the previously charged capacitor Cs is dissipated into resistor Rs during the capacitor Cs discharge cycle. The purpose of the diode Ds is to bypass current flow in resistor Rs during the capacitor Cs charging period, thereby eliminating power dissipation in resistor Rs.

Further, the power loss in resistor Rs during the capacitor Cs discharge period increases not only with the increased value of capacitor Cs but also with the increase of DC bus voltage and the operating frequency. As a result, in many applications, the uses of RCD snubbers are not practical.

RCD Snubber in a Half-Bridge Power Converter

Examples and explanations of RCD snubbers can readily be found in published literature. However, for clarity a specific example of an RCD Snubber in a Half-Bridge Power Converter is given as follows.

The High Intensity Discharge (HID) lamps, such as High Pressure Sodium and Metal Halide lamps, exhibit acoustic resonance when they are excited with a frequency that is higher than 2-3 kHz. However, certain higher wattage High Intensity Discharge lamps with large envelopes do not exhibit acoustic resonance, provided they are excited with a frequency that is higher than 100 kHz. The following design parameters are chosen for a High Intensity Discharge lamp electronic ballast: a) half-bridge resonant inverter topology, b) DC bus voltage ~450V; c) power into the lamp ~250 W; and d) operating frequency ~120 kHz. It is found that a minimum of 680 pF snubber capacitor value across each power switch is necessary for an acceptable level of dv/dt and switching loss reductions. Therefore, the loss in each snubber resistor is $=(450V^2/2) \times 680$ pF$\times 120$ kHz~8.3 W, a total of ~2$\times$8.3 W=16.6 W. A snubber resistor that must dissipate 8.3 W shall be rated for ~15 W. The physical size of a 15 W resistor is large. Therefore, not only must the enclosed ballast housing accommodate these two large snubber resistors but also heat removal by natural convection in a sealed environment becomes impractical.

Further, although an RCD snubber reduces rate of dv/dt, it fails to provide protection against shorts in power switches. FIG. 5B shows a prior art RCD Snubber in a Half-Bridge Power Converter that, at turn on, can minimize a temporary short circuit in a power switch due to opposite diode conduction. In FIG. 5B, the power switches S1 and S2 are MOSFETs, and the diodes D1 and D2 are respective body diodes. The control circuit SC governs the switching cycles of power switch S1 and power switch S2. A small value center-tapped inductor Lc with two identical closely coupled sections Lc1 and Lc2 is added between power switch S1 and power switch S2. The load (not shown) is connected at the center point, C, of inductor Lc. The inductor Lc limits short circuit current between power switch S1 and D2 and also between power switch S2 and diode D1. At the instant when power switch S2 turns OFF and power switch S1 turns ON, the diode D2 experiences the reverse recovery as described above with respect to FIG. 4B. Following this reverse recovery, when the voltage across power switch S2 reaches the DC bus voltage, the diode Dc of FIG. 5B becomes forward biased and it starts to discharge stored energy of inductor Lc into the resistor Rc. A similar situation applies to power switch S1 turn-off and power switch S2 turn-on period. Without these inductor energy release circuit components resistor Rc and diode Dc, the voltages at the points A and B are lower than –VC and higher than +VC, respectively, following power switch S1 and power switch S2 turn-off periods.

Further, in FIG. 5B the combination of resistor Rs1, capacitor Cs1, and diode Ds1 acts as an RCD snubber for the power switch S1; and the resistor Rs2, capacitor Cs2, and diode Ds2 combination acts as an RCD snubber for the power switch S2. The inductance value of inductor Lc is low, and each winding inductance value is usually in between a few hundred nanohenry to several micro-henry. Assuming that each winding of inductor Lc has a value of 3 uH, the DC bus voltage magnitude is ~300V, and the $t_{rr}$ of diode D1 and diode D2 is ~200 nS. Since each half of the primary winding section of inductor Lc is wound on the same core, the total inductance between the points A and B is higher than the inductance of each section and it is ~8 uH. Using these values, during a short of either of the power switches S1, S2, the maximum current peak that can reach during a reverse recovery period of 200 nS is ~(300 V/8 uH)$\times$200 nS=7.5 A. Consequently, without the addition of this inductor Lc and assuming a circuit parasitic inductance of 100 nH, the theoretical short circuit current peak is ~600 A.

Therefore, the scheme of FIG. 5B provides a substantial solution for overcoming most of the undesirable features of a switch mode power converter as described earlier. The following summary of the benefits makes this point even more clear: a) provides protection against temporary short-circuits between power switch S1 and diode D2 and also between power switch S2 and diode D1; b) provides protection against temporary cross conduction between power switch S1 and power switch S2 in the event of simultaneous turn-on of these power switches due to circuit transients; c) since there is an inductance placed between power switches S1 and S2, it also reduces turn-on losses; and 4) the addition of RCD snubbers across power switch S1 and power switch S2 reduce turn-off related switching loss and dv/dt.

The primary disadvantages of the scheme of FIG. 5B are: a) in order to release inductive energy during power switch S1 and power switch S2 turn-off periods, the resistor Rc must dissipate this energy which may account for in excess of 2-3% power loss; and b) the power dissipations in RCD snubbers. This dissipation also may cause an additional 2-5% power loss. Therefore, if this prior art circuit scheme is incorporated in the earlier example of the 250 W electronic High Intensity Discharge lamp ballast, the combined power dissipation in the RCD snubber and inductor resistors may exceed 20 W.

The primary objective of the present switch mode power converter having multiple inductor windings equipped with snubber circuits is to eliminate the above-mentioned disadvantages of the schemes of FIG. 5B.

Key Circuit Behaviors

For the purpose of this description, certain key circuit behaviors (hereafter, K1) are to be described as follows:

K1$a$: Leading power factor case: In his case, as described earlier with respect to FIG. 5B, the diode D2 starts to recover after power switch S1 turns on. However, it is only after the diode D2 recovery that the voltage at the point B of inductor Lc starts to reverse towards +VC The voltage at point B remains low until diode D2 fully recovers. Similarly, the voltage at point A remains high until the diode D1 recovers following the power switch S2 turn-on. After the recovery, the voltage at point A reverses toward −VC.

K1$b$: Lagging power factor case: In this case, the voltage at point B starts to go positive immediately following the power switch S2 turn-off. This voltage reversal doesn't wait for power switch S1 to turn on. Similarly, the voltage at point A starts to go negative immediately following the power switch S1 turn-off.

K1$c$: The fly-back voltage that is developed at point B during the transition from power switch S2 OFF to power switch S1 ON is positive, independent of leading or lagging power factor type of load. Similarly, the fly back voltage that is developed at point A during the transition from power switch S1 OFF to power switch S2 ON is negative, independent of the load type.

K1$d$: The potential that is developed across each section of the centered tapped inductor during a short or during the normal operation is negligible.

Figure 6A:
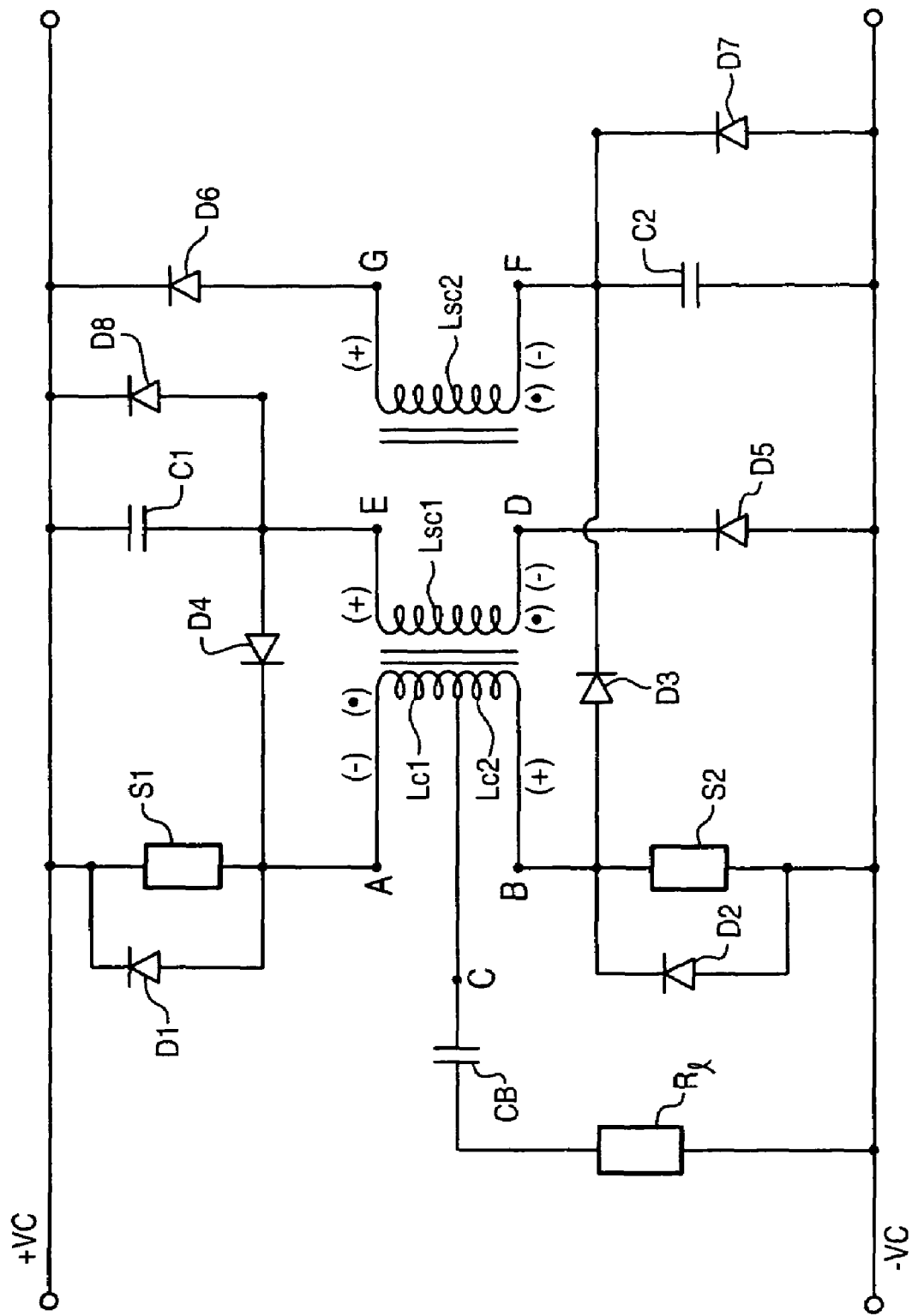
FIGS. 6A-6D illustrate preferred circuit arrangements of the switch mode power converter having multiple inductor windings equipped with snubber circuits.

Switch Mode Power Converter Having Multiple Inductor Windings Equipped with Snubber Circuits FIG. 6A illustrates one of the preferred circuit arrangements of the switch mode power converter having multiple inductor windings equipped with snubber circuits. In FIG. 6A, the primary windings Lc1 and Lc2 together comprise a center-tapped inductor Lc. Further, inductor Lc has two secondary windings Lsc1 and Lsc2. The number of turns of each of the secondary windings is often, but not limited to, the same as the number of turns of the overall primary windings. The diodes D3 through D8 are clamping diodes that have ultra fast reverse recovery characteristics. In certain low power applications, the diodes D5 and D6 can be shorted and the diodes D7 and D8 can be eliminated. Based on the key circuit behaviors K1, as described earlier, the fly-back voltage at point A that appears during the transition from power switch S1 OFF to power switch S2 turn-on (hereby, transition S1-S2) is negative. This is indicated by the symbol (−). Similarly, the fly-back voltage at point B that appears during the transition from power switch S2 OFF to power switch S1 turn-on (hereby, transition S2-S1) is positive. This is indicated by the Symbol (+). The polarity of the inductor Lc winding is indicated by a dot symbol (•) at point A. The corresponding polarities of the secondary windings are also indicated by a dot symbol (•) at points D and F. Therefore, the fly-back voltages that appear at point D of the secondary winding Lsc1 and at point F of the secondary winding Lsc2 during the transition S1-S2 transition period are negative and indicated by the symbol (−). Similarly, the fly-back voltages that appear at points E and G during the transition S2-S1 transition period are positive and indicated by the symbol (+). Therefore, during the transition S1-S2 transition period as the voltage starts to go below −VC at point A, the voltage is clamped to approximately −VC by the series connected network diode D5, inductor Lsc1, and diode D4. Similarly, during the transition S2-S1 transition period as the voltage at point B starts go above +VC, it is clamped approximately to +VC by the series connected network diode D3, inductor Lsc2, and diode D6.

The key circuit behavior, K1$d$, as described earlier plays a vital role in these clamping actions as follows:

a) The diodes D3 and D4 conduct only when fly-back voltages appear. During a short, the primary impedance of the inductor Lc is not affected by the secondary windings and, as a result, inductor Lc limits the short circuit current as it was in the case of FIG. 5B;

b) The inductor energy at point A is returned to voltage −VC by the network consisting of diode D4, inductor Lsc1, and diode D5. Similarly, the inductor energy at point B is returned to voltage +VC by the network consisting of diode D3, inductor Lsc2, and diode D6. In other words, the energy that is stored in inductor Lc during the transition periods of transition S1-S2 and transition S2-S1 is returned to the DC bus voltage source. Therefore, this circuit eliminates the energy loss in resistor Rs of FIG. 5B; and c) During these energy returns, the secondary winding polarity arrangements provide very fast clamping.

For example, when the voltage at point A goes negative, at the same time the voltage at point E goes positive and the voltage at point D goes negative. As a result, the network consisting of diode D4-inductor Lsc1-diode D5 immediately stops the voltage at point A from going further negative by passing current from −VC to point A. In other words, because inductor Lsc1 is a secondary winding of inductor Lc, and due to their polarity orientations, the clamping to voltage −VC occurs as soon as the voltage at point A starts to go negative. If inductor Lsc1 were a separate inductor, it would have delayed this clamping. The network consisting of diode D3-inductor Lsc2-diode D6 performs a similar fast clamping action when the voltage at point B tries to go above voltage +VC.

Figure 6B:
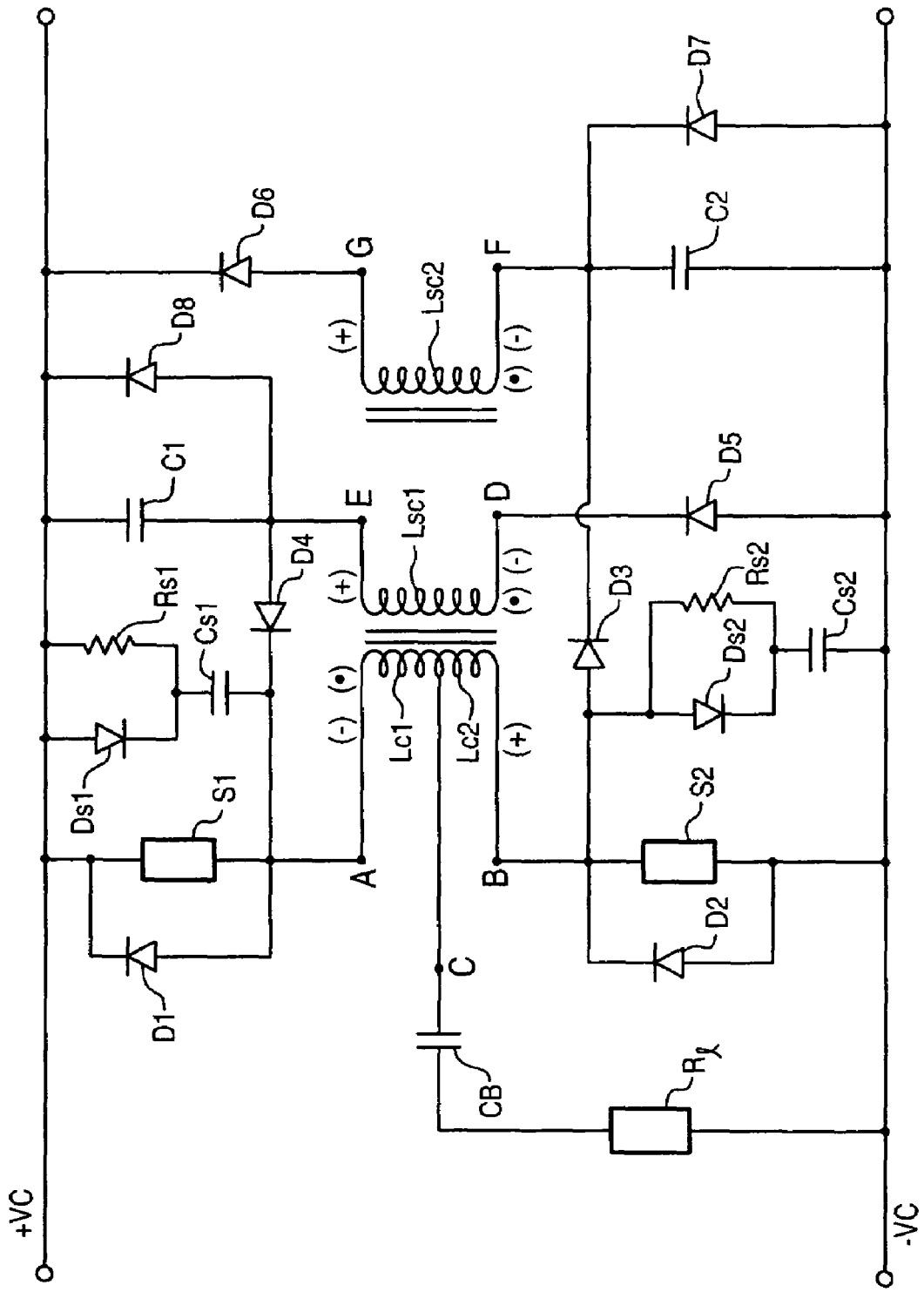
Figure 6C:
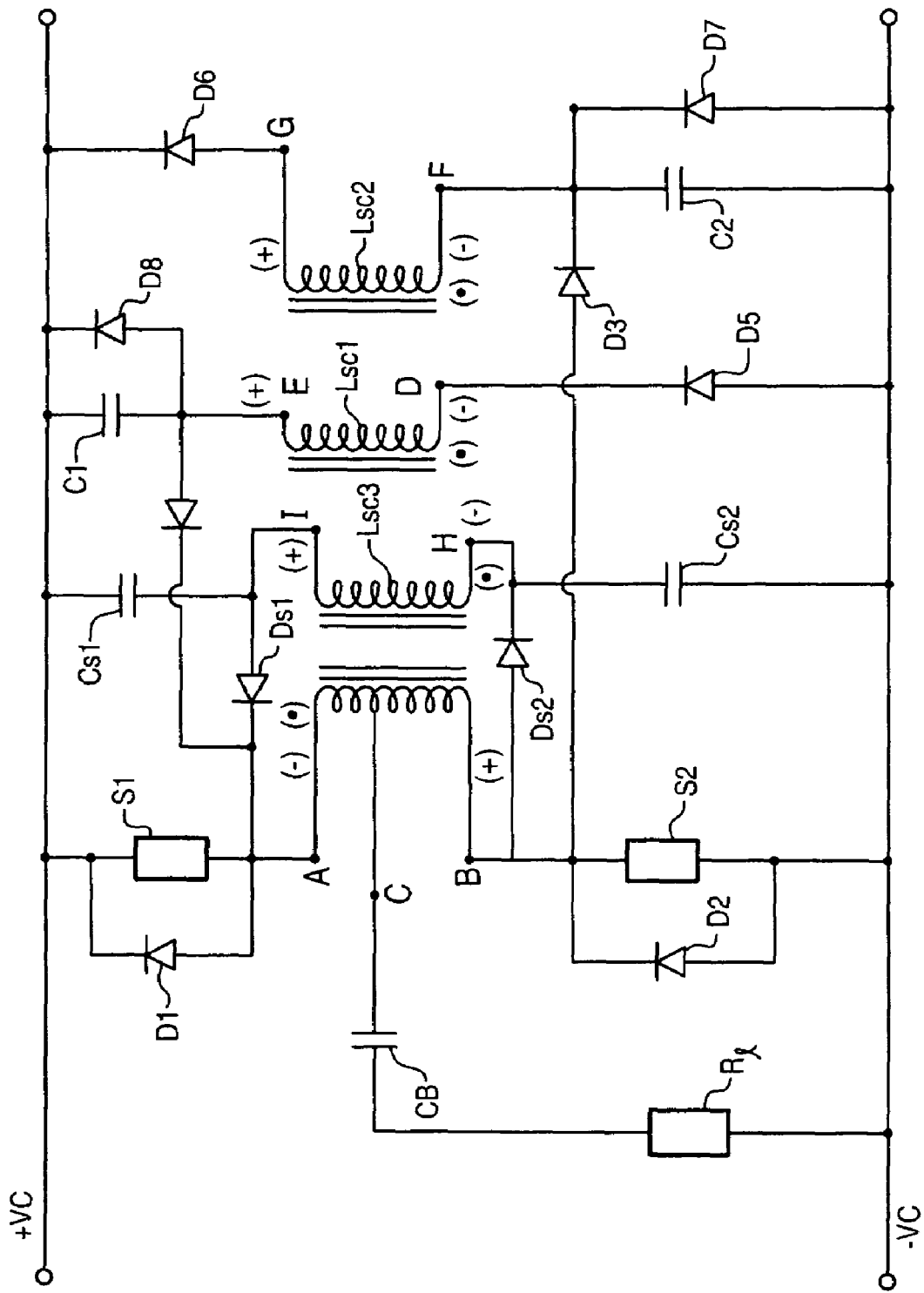

Further, the diodes D3 and D4 carry only the fly-back current that lasts for a short duration. Therefore, the average power dissipation in these diodes is low. Further, although the capacitors C1 and C2 provide a limited loss less snubbing, they primarily act as high frequency small value bypass capacitors. Further, the RCD snubber of FIG. 5A may be used across power switch S1 and also across power switch S2 for further dv/dt control. However, the circuit of FIG. 6A requires very small value snubber capacitors for dv/dt and switching loss reductions. FIG. 6B is a variation of FIG. 6A that incorporates an RCD snubber consisting of resistor Rs1, diode Ds1, and capacitor Cs1 across power switch S1, and an RCD snubber consisting of resistor Rs2, diode Ds2, and capacitor Cs2 across power switch S2. Further, FIG. 6C is a variation of FIG. 6B where a third secondary winding Lsc3 is added to replace the dissipating snubber resistors Rs1 and Rs2 of FIG. 6B. The diodes D7 and D8 are primarily for noise suppressions and in many applications may be eliminated. This is shown in FIG. 6D and represents one of the most preferred arrangements of the switch mode power converter having multiple inductor windings equipped with snubber circuits.

Figure 6D:
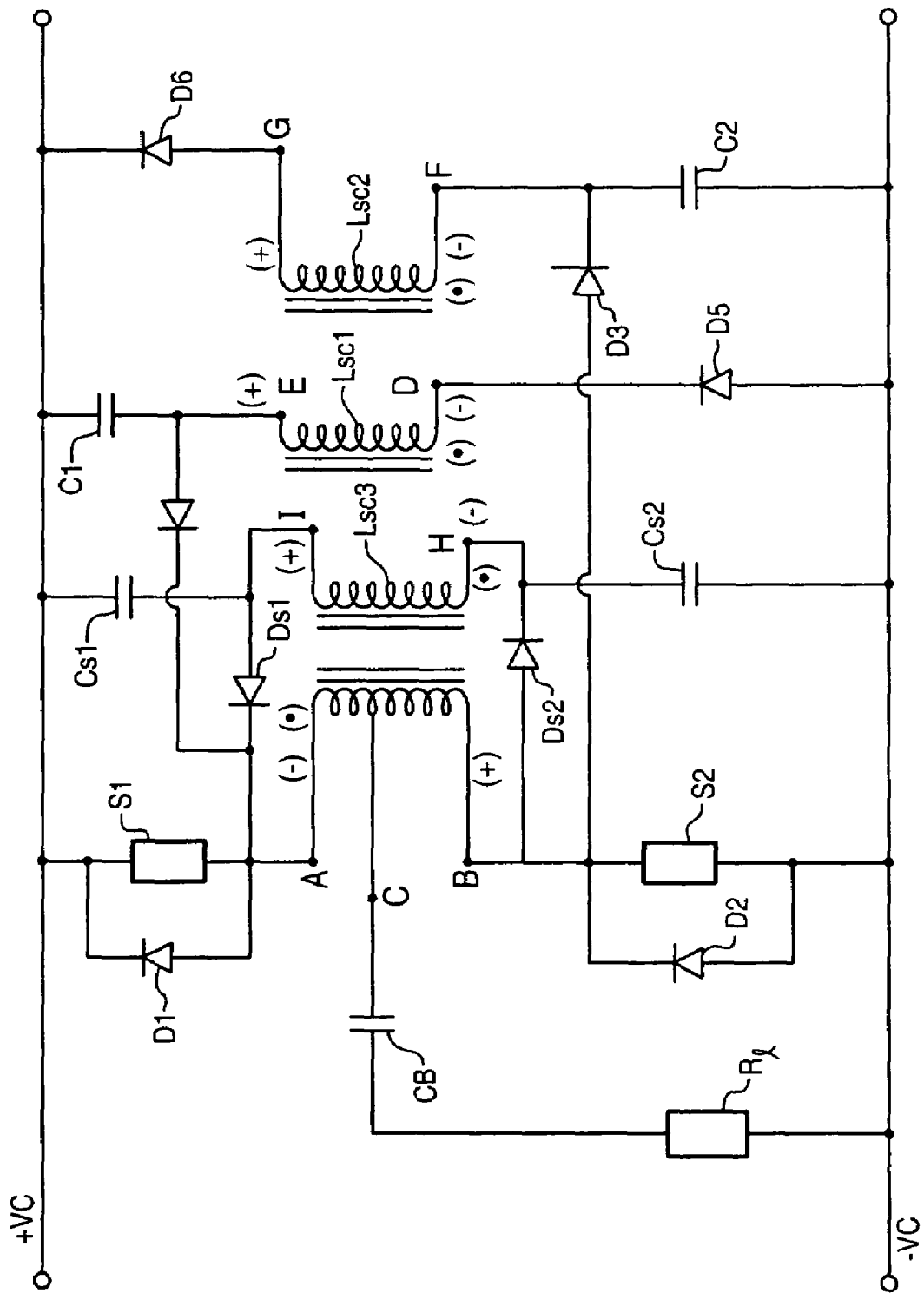

An experimental 250 W half-bridge resonant inverter ballast for a 250 W HPS lamp was built using the circuit of FIG. 6D. The following design parameters were used. DC bus voltage=450V, operating frequency=120 kHz, Lc1=Lc2~3 uH with 5 turns each, Lsc1~17 uH with 12 turns, and Cs1=Cs2=1000 pF. In comparison with the prior art scheme of FIG. 5B, the circuit of FIG. 6D provides improved circuit performance by saving 12 W energy, that is, approximately 5% higher power conversion efficiency. Further, the rate of voltage rise dv/dt was reduced from ~3V/nS to ~1V/nS. Consequently, this 12 W energy savings alone makes it possible to reduce the size of the ballast enclosure by 50%.

Alternative Switch Mode Power Converter

Further, in many low power applications and devices that have good circuit layout, the circuit of FIG. 6D can be further simplified by eliminating the need for the first and the second secondary windings. This is shown in FIG. 7A whereby the secondary winding Lsc1 in combination with the snubber diodes D3 and D4 and the snubber capacitors Cs1 and Cs2 provide an acceptable level of turn-off related voltage spikes, switching loss, and dv/dt control.

Figure 7A:
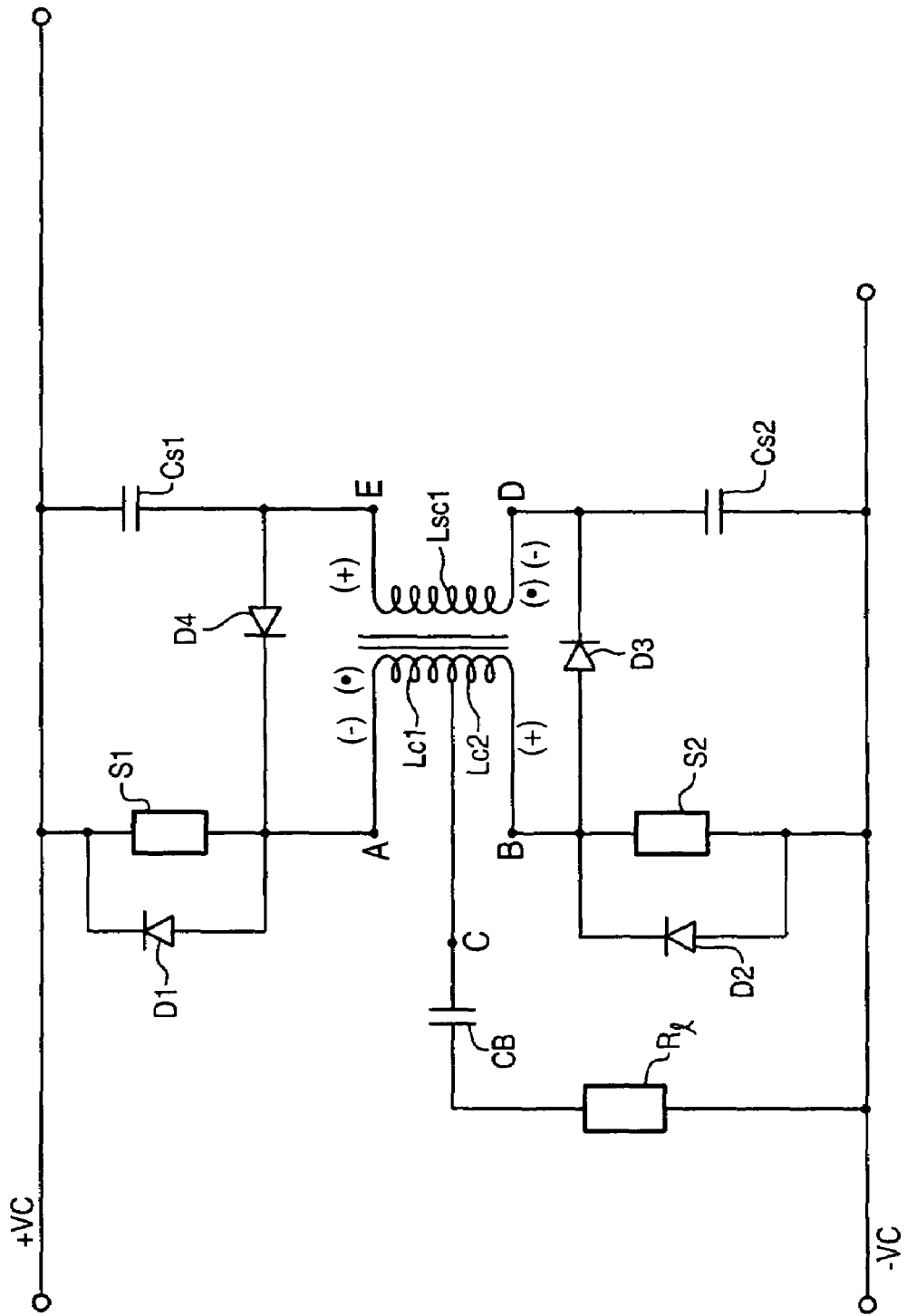
FIGS. 7A-7C illustrate a variation of the preferred circuit arrangements of the switch mode power converter having multiple inductor windings equipped with snubber circuits of FIGS. 6A-6D.

A further explanation of charging and discharging cycles of snubber capacitors in FIGS. 6D and 7A are given as follows: when power switch S2 turns OFF, the previously discharged capacitor Cs2 causes to hold the voltage across power switch S1 at a lower value and thereby reduces turn-off switching loss and dv/dt. However, unlike the discharge current limit resistor Rs of FIG. 5A or resistor Rs2 of FIG. 5B, during the turn-on of power switch S1, the discharge current of capacitor Cs2 is controlled by the combined inductance of inductors Lc and Lsc1. This is due to the polarity arrangement of inductors Lc and Lsc1 where the inductances of inductors Lc and Lsc1 are additive. Further, the combined inductance value of inductors Lc and Lsc1 is usually higher than 20 uH, and the snubber capacitor CS2 value is usually less than 1000 pF. Therefore, a combined 20 uH inductance in series with capacitor Cs2 sufficiently limits discharge current peaks. However, the significance of discharging a capacitor connected in series with an inductor vs. connected in series with a resistor is that, in the case of the series connected inductor that has a low number of turns, the dissipation in the inductor is negligible. Consequently, the snubber capacitor Cs1 charging and discharging cycles are identical to the case of capacitor Cs2.

Further, during the power switch S1 turn-off period, besides reducing dv/dt, the previously discharged capacitor Cs1 also assists in reducing the voltage spikes across Lc. Similarly, during the power switch S2 turn-off period, the previously discharged capacitor Cs2 assists in reducing the voltage spikes across inductor Lc.

Further, in the case when power switch S2 turns on, it not only causes capacitor Cs2 to discharge via inductor Lsc1, diode D4, and inductor Lc, but it also pulls the voltage at capacitor Cs1 down near –VC via diode D4 and inductor Lc. Therefore, at turn-off, not only does capacitor Cs2 act as a snubber but also capacitor Cs1. However, the contribution to snubbing of capacitor Cs1 is limited and delayed due to the presence of series connected inductor Lsc1. A similar snubbing action occurs during the power switch S1 turn-off. However, in this case the primary snubber capacitor is capacitor Cs1. The snubber capacitor Cs2 provides a limited and delayed snubbing.

Figure 7B:
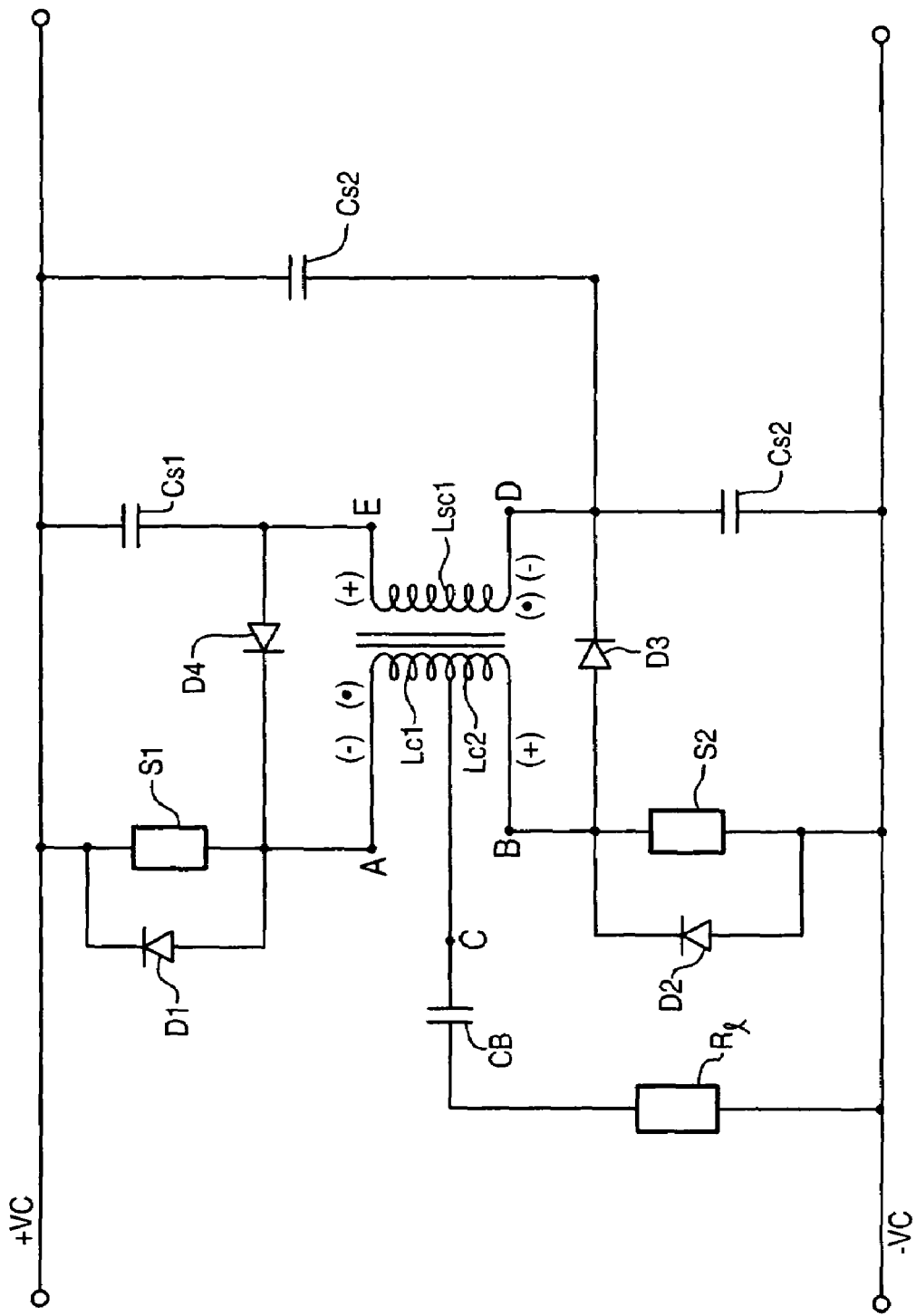
Figure 7C:
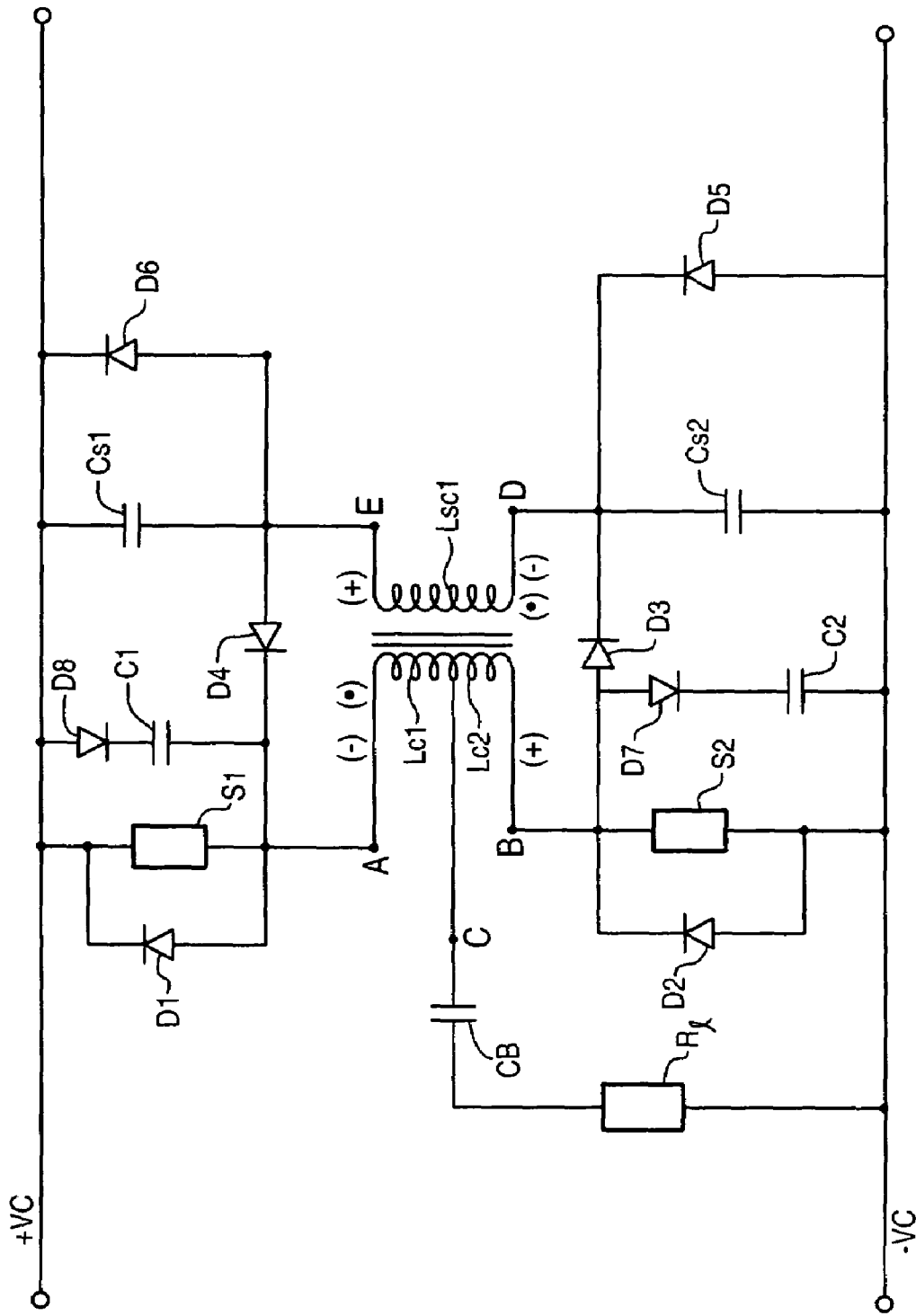

FIG. 7B is a variation of FIG. 7A whereby the capacitor Cs2 is connected between +VC and the cathode of diode D4. Further, the FIG. 7C is also a variation of FIG. 7A whereby the diodes D5, D6, D7, and D8 and the capacitors C1 and C2 are added. These components provide additional circuit noise immunity.

Figure 8:
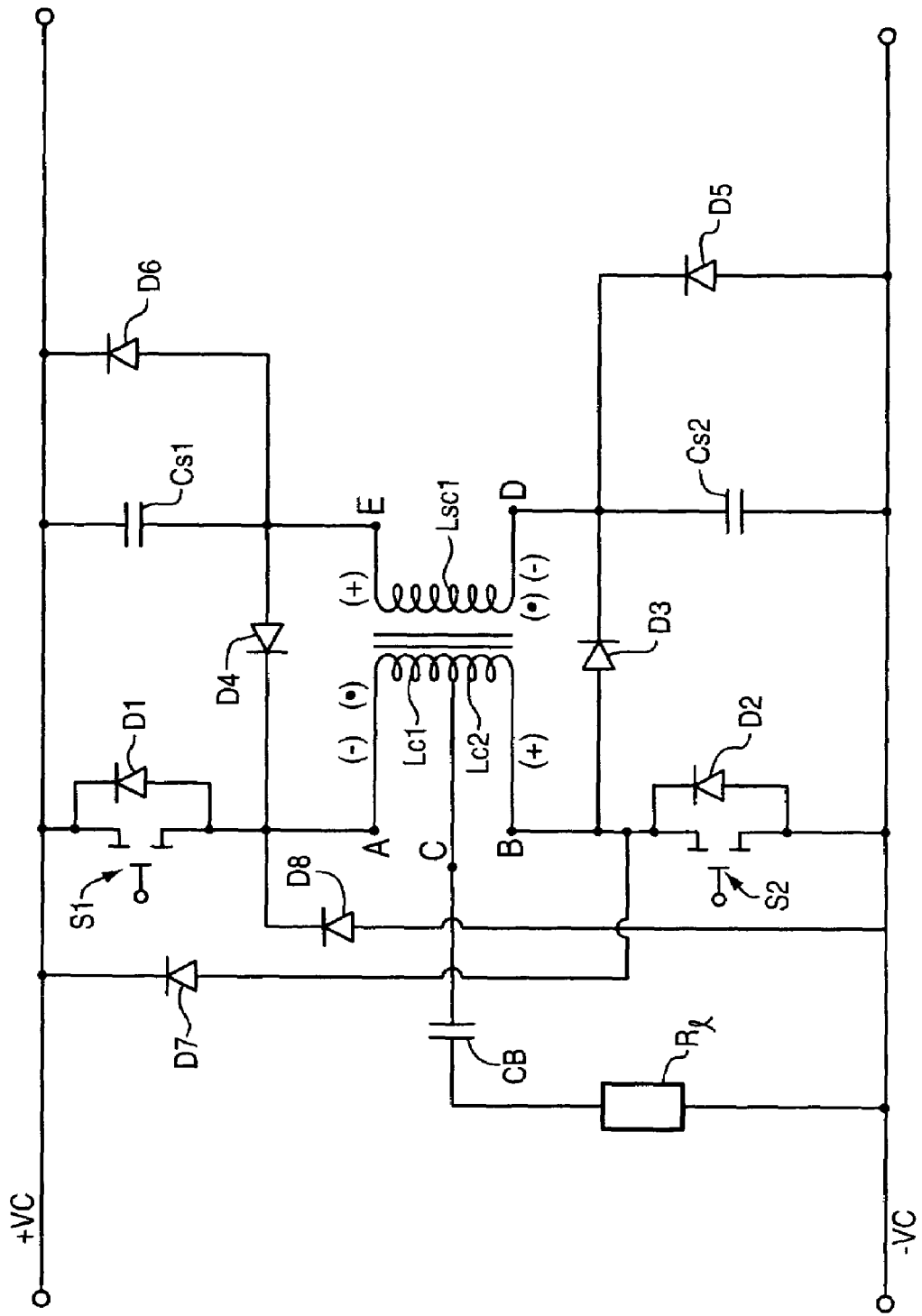
FIG. 8 illustrates a variation of the preferred circuit arrangements of the switch mode power converter having multiple inductor windings equipped with snubber circuits of FIG. 7A.

FIG. 8 is a further variation of FIG. 7A. In this case, two additional ultra fast diodes D7 and D8 are added. The addition of these diodes reduces commutation current in diode D1 and diode D2, the respective body diodes of the MOSFET power switch S1 and the MOSFET power switch S2. On the other hand, the addition of diodes D7 and D8 reduces circuit effectiveness against temporary short in the case of leading load current of FIG. 4D. Therefore, unless diodes D7 and D8 have guaranteed $t_{rr}$ of less than 50 nS, the use of the circuit of FIG. 8 is limited to load with lagging load current such as resonant inverter based HID and fluorescent lamp electronic ballasts that operate above resonance at all time.

Figure 9:
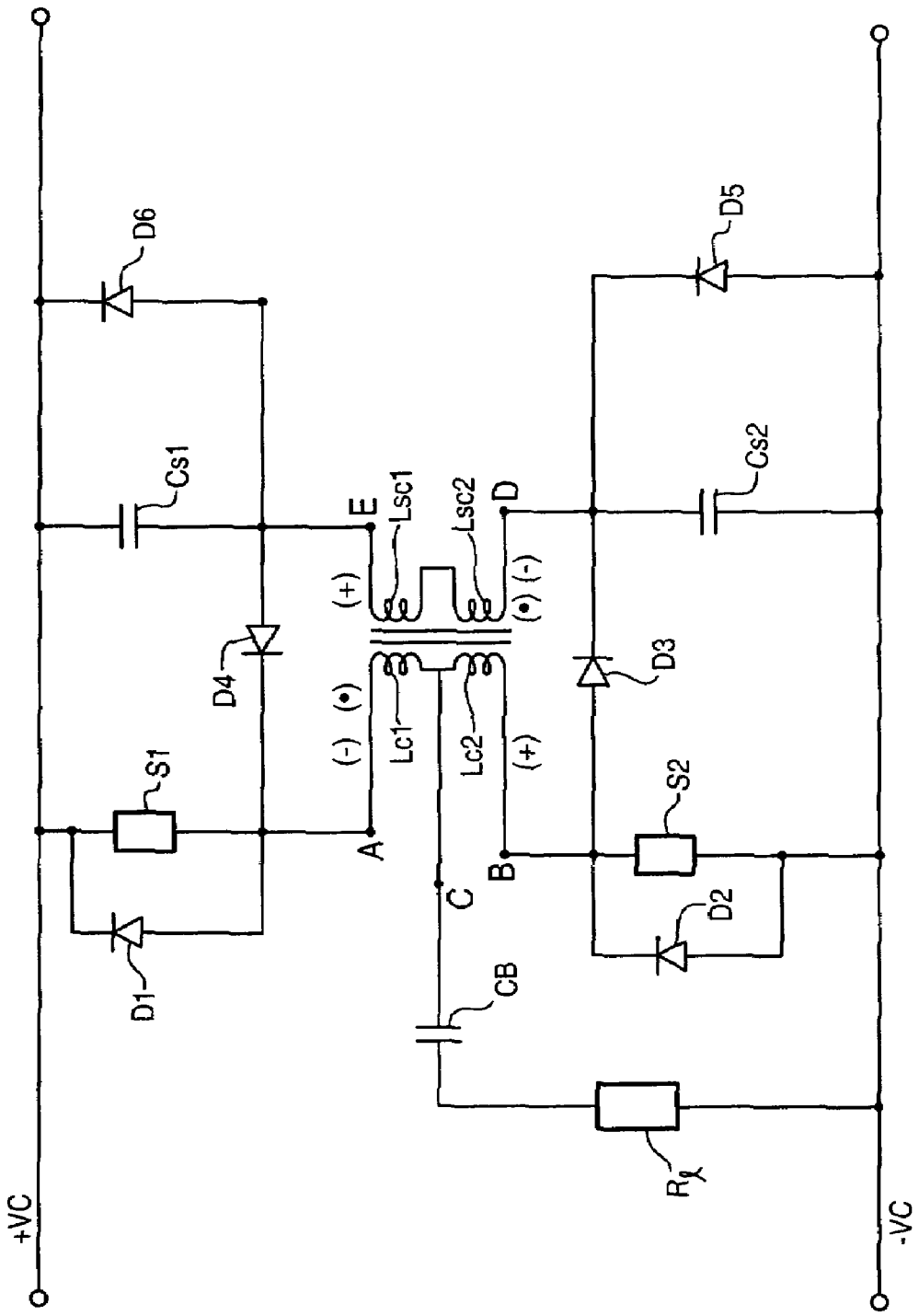
FIG. 9 illustrates a variation of the preferred circuit arrangements of the switch mode power converter having multiple inductor windings equipped with snubber circuits of FIG. 7A.

Further, the inductor Lc in FIG. 7A is wound on a single core, preferably a toroidal core. However, each individual primary section Lc1 with a secondary winding Lsc1 and Lc2 with a secondary winding Lsc2 can also be wound on separate cores at the expense of increased cost and space requirements. One such arrangement is shown in FIG. 9.

Further, it is evident to anyone skilled in the art that in certain applications where short circuits between power switches and commutating diodes do not occur and also where power switches can handle higher snubber capacitor discharge current, the secondary winding Lsc1 in FIG. 7C can be eliminated and the cathode of diode D3 can be connected to the anode of diode D4. Further, a small value resistor can also be inserted between the cathode of diode D6 and the anode of diode D5. Further, in order to divert a portion of the commutating current, additional claming diodes may be connected at the center point C of the inductor Lc.

Single Power Switch Power Converters

Figure 10:
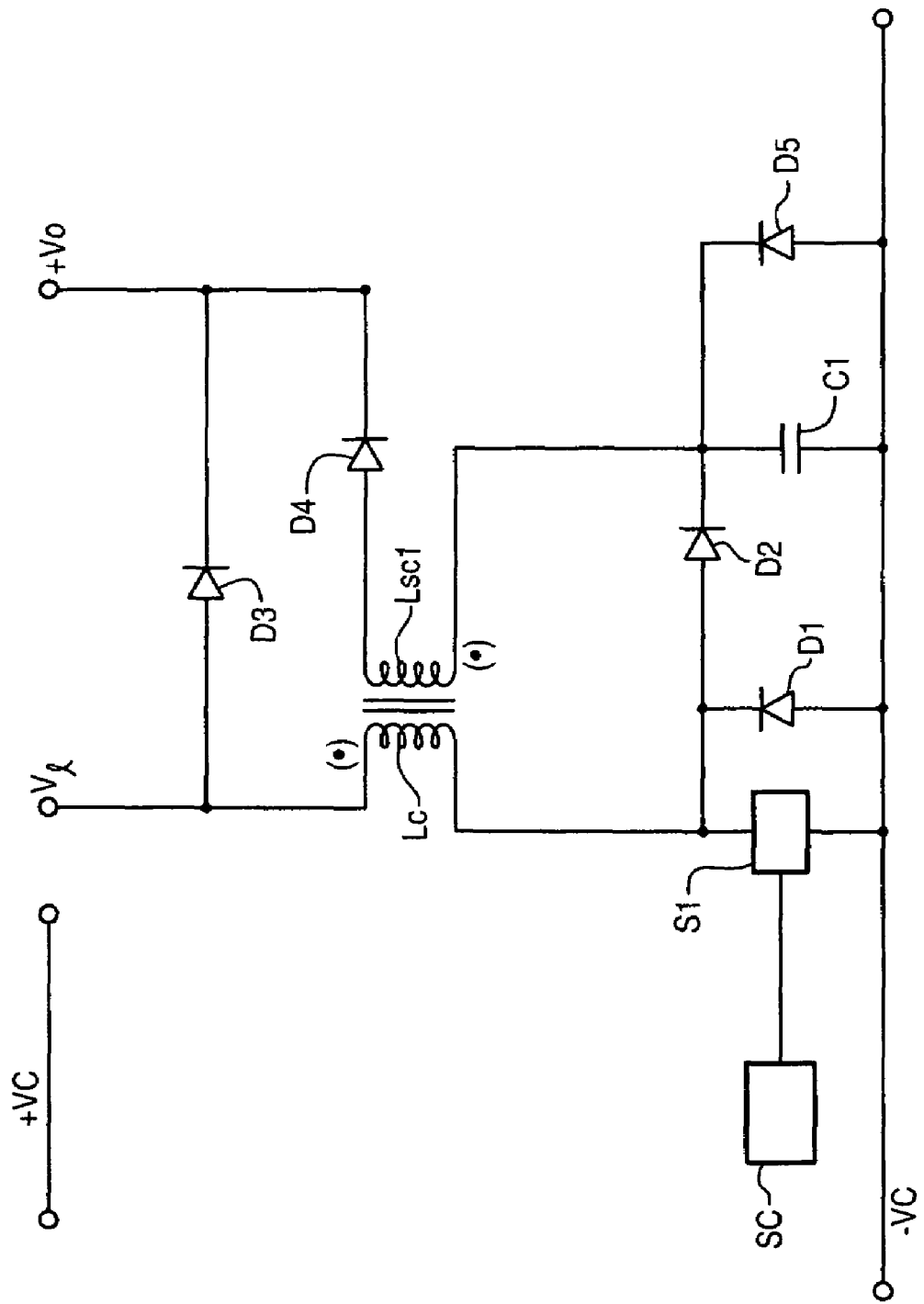
FIG. 10 illustrates a variation of the preferred circuit arrangements of the switch mode power converter having multiple inductor windings equipped with snubber circuits of FIGS. 6A-6D.

There are many circuit topologies such as fly-back and boost converters that require single power switches. The circuits of FIGS. 6A-6D and FIGS. 7A-7C can be used in these applications as loss less snubber circuits. The following description represents some of these arrangements; however, it is evident to one skilled in the art that many variations are possible without departing from the spirit or scope of this invention. The circuit arrangement of FIG. 10 is based on FIGS. 6A-6D, and this is suitable for switch mode topologies that use a ground (–VC) referenced power switch S1, such as boost, fly-back, forward, and push-pull power converters. In FIG. 10, the load is switched between +VC and $V_l$. The inductor Lc is the primary winding of the snubber inductor without a center-tap, and Lsc1 is the secondary winding of the snubber inductor. Diodes D1, D2, D3, D4, and D5 are flyback diodes. The diodes D4 and D5 are primarily used for noise suppression. As before, in many low power applications, the diode D4 may be shorted and the diode D5 may be eliminated. Capacitor C1 is a small value high frequency bypass capacitor. SC is the control circuit for power switch S1. The notations +VC and –VC indicate polarities of the input DC bus voltage. The notation +Vo represents the output voltage, and the notation $V_l$ represents the load that is to be switched by the power switch S1. It must be noted that diode D3 is the primary fly-back diode for the load current, while the diodes D2, D4, and D5 experience minimum current flow, therefore, their ratings are low and sizes are small.

Figure 11:
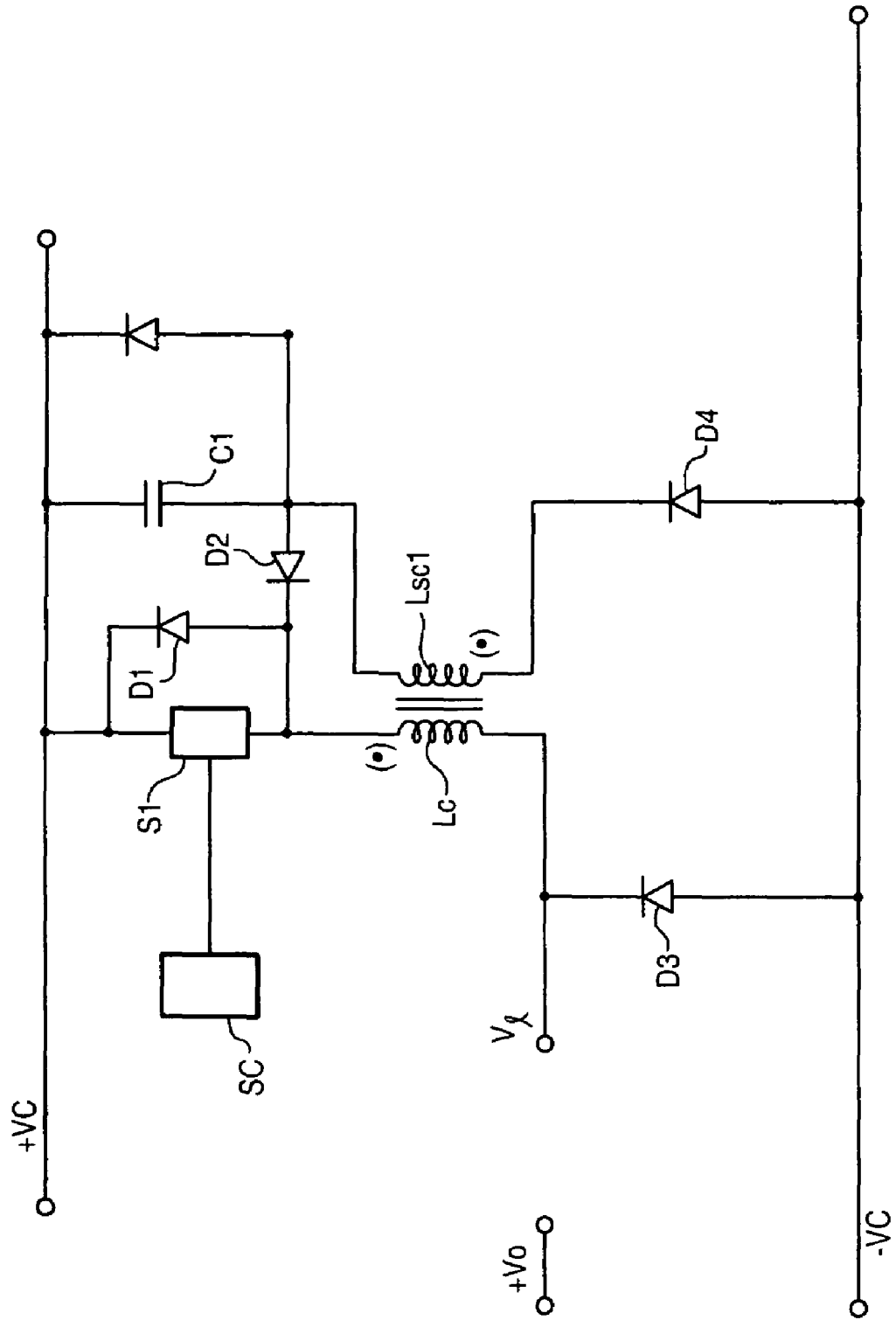
FIG. 11 illustrates a circuit arrangement of the switch mode power converter having multiple inductor windings equipped with snubber circuits that is suitable for switch mode topologies that use high side referenced power switches.

Further, a power converter circuit that is suitable for switch mode topologies that use high side (+VC) referenced power switches S1 such as buck converters is shown in FIG. 11. The load is switched between $V_l$ and +Vo. Further, the circuits of FIGS. 10 and 11 are particularly beneficial in applications where the power switch S1 turns ON while diode D3 still conducts. In these applications, the snubber inductor's primary winding Lc limits the short circuit current between diode D3 and power switch S1. Similarly, the secondary winding limits the short circuit current between diodes D2-D4 and power switch S1.

Figure 12:
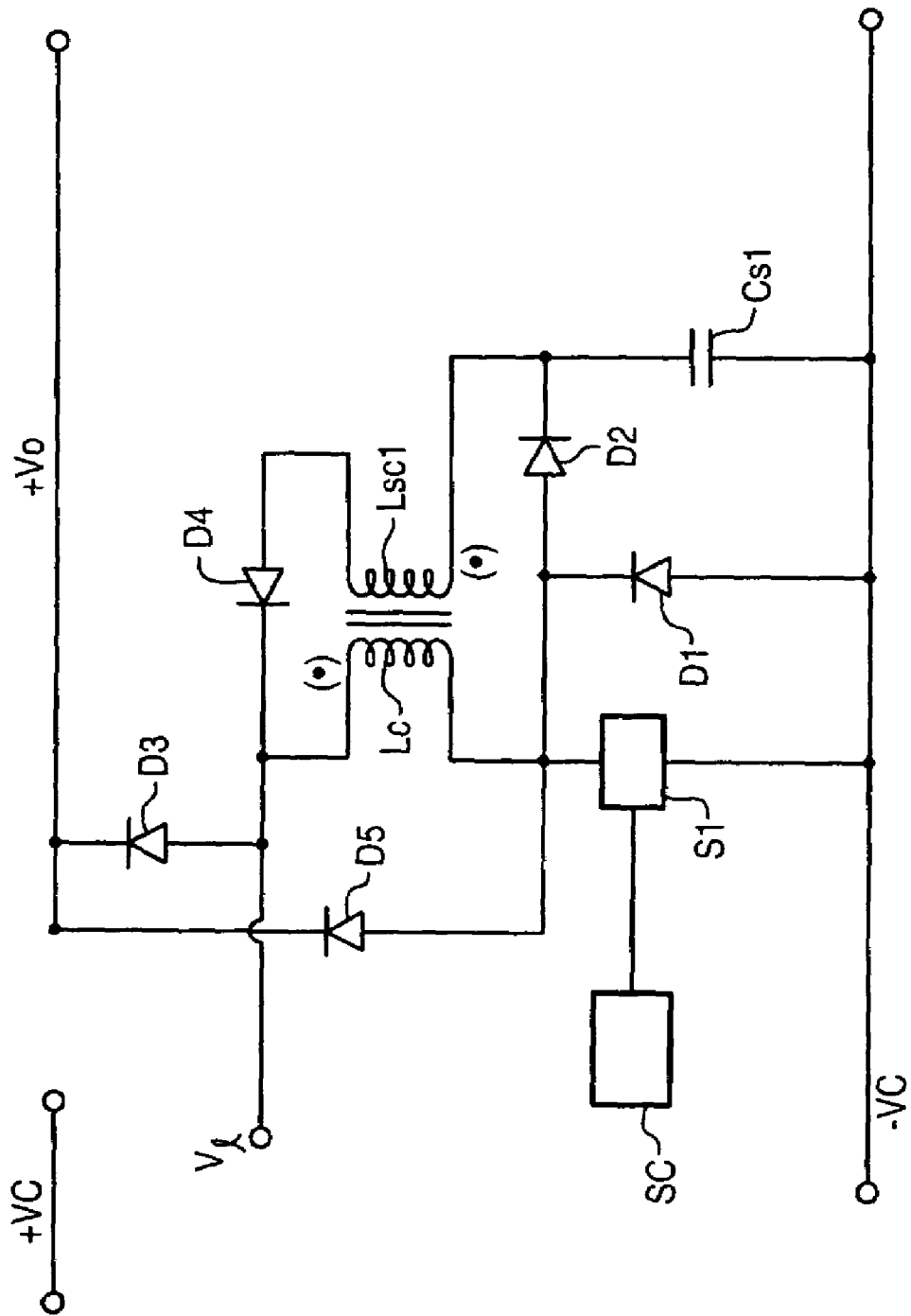
FIG. 12 illustrates a variation of the circuit arrangements of the switch mode power converter having multiple inductor windings equipped with snubber circuits shown in FIGS. 7A-7D.
Figure 13:
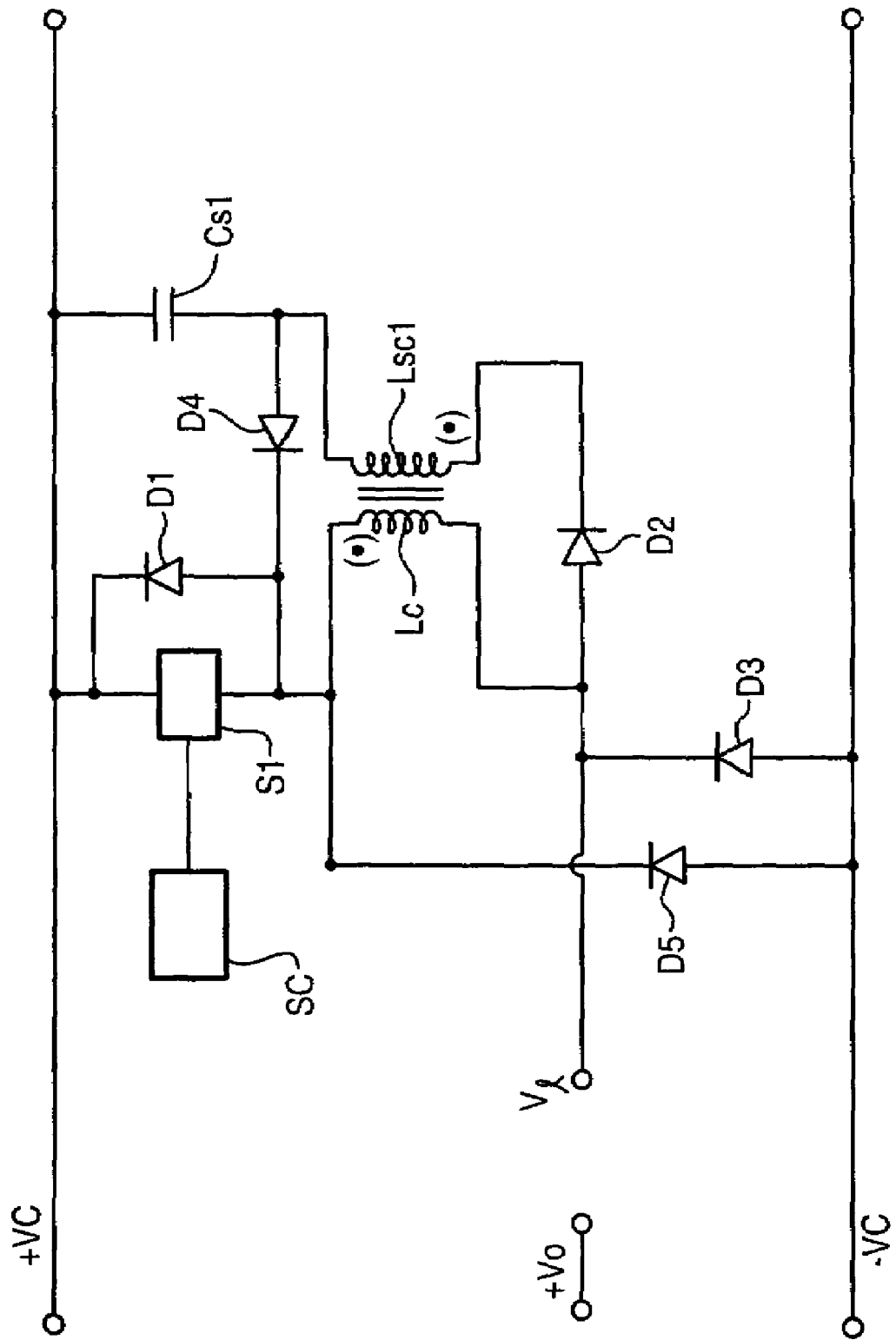
FIG. 13 illustrates a variation of the circuit arrangements of the switch mode power converter having multiple inductor windings equipped with snubber circuits of FIGS. 7A-7D.

Further, FIGS. 12 and 13 are based on the circuits of FIGS. 7A-7C and are suitable where shorts between commuting diodes and switches can be ignored. The circuit of FIG. 12 is for a ground-referenced switch, and the circuit of FIG. 13 is for a high side switch. The diodes D1-D5 are fly-back diodes. S1 is the power switch and SC is the control circuit. Lc is the primary winding, and Lsc1 is the secondary winding of the snubber inductor. Cs1 is the snubber capacitor.

Figure 14:
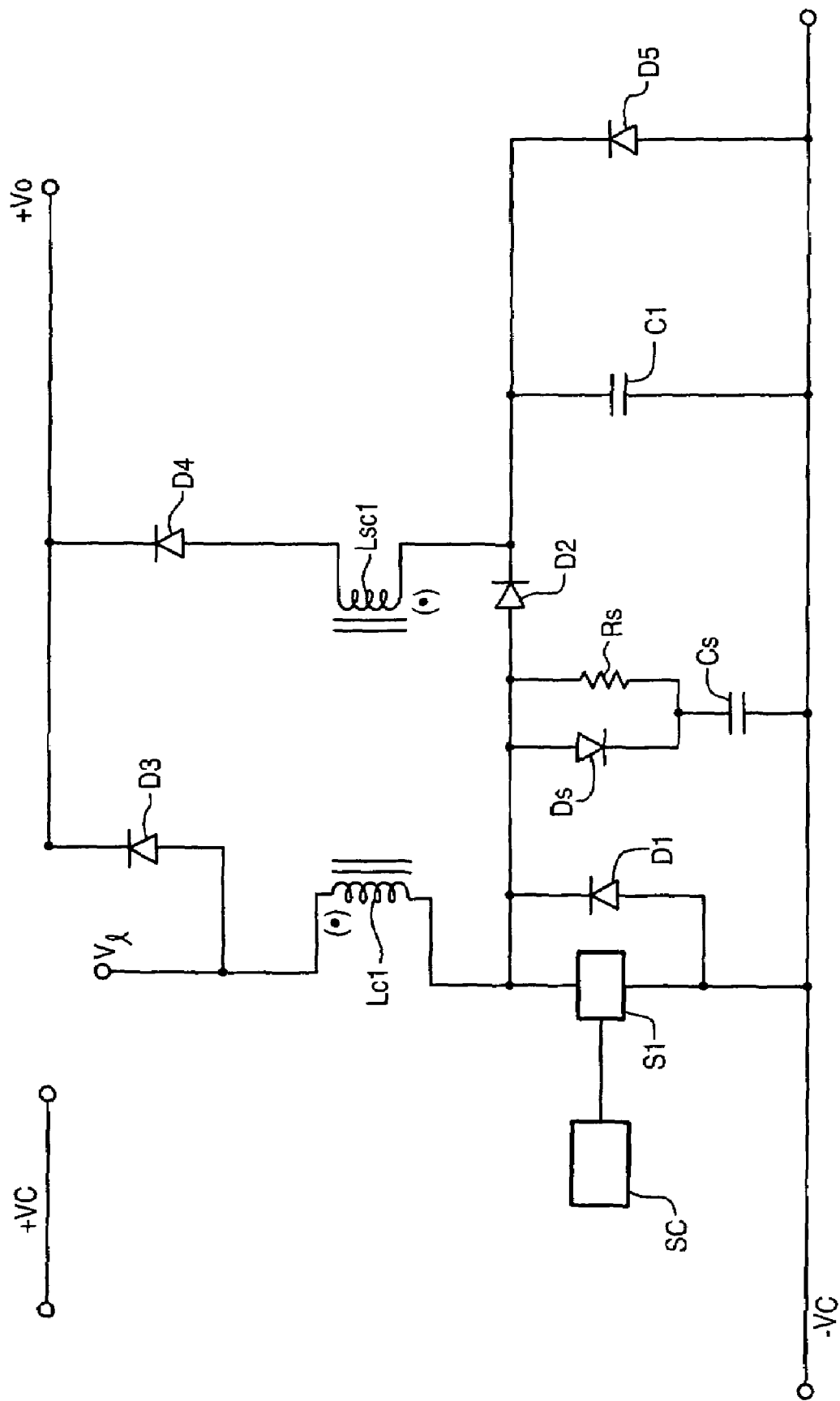
FIGS. 14 and 15 illustrate a variation of the circuit arrangements of the switch mode power converter having multiple inductor windings equipped with snubber circuits of FIGS. 10-13 with the inclusion of an RCD snubber.

Further, the circuits of FIGS. 10, 11, 12, and 13 sufficiently clamp turn-off spikes; however, a small value RCD snubber may be added to the power switch S1 for further dv/dt control. As an example, FIG. 14 shows the addition of an RCD snubber consisting of diode Ds, resistor Rs, and capacitor Cs. However, as before, this dissipative RCD snubber can be replaced by the addition of a second secondary winding Lsc2 and diodes D6-D7 for loss less dv/dt control. This is shown in FIG. 15.

Figure 15:
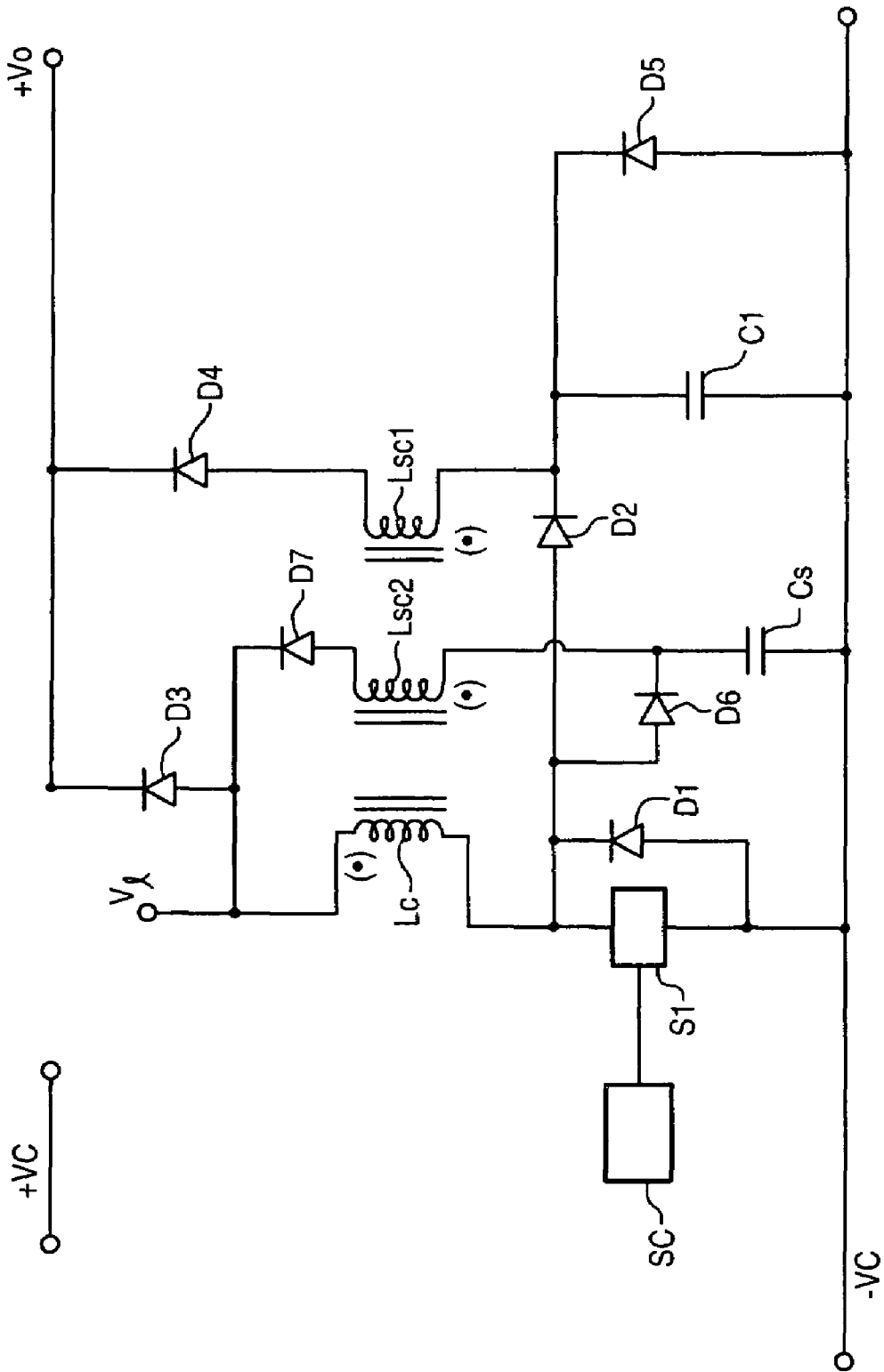
Figure 16:
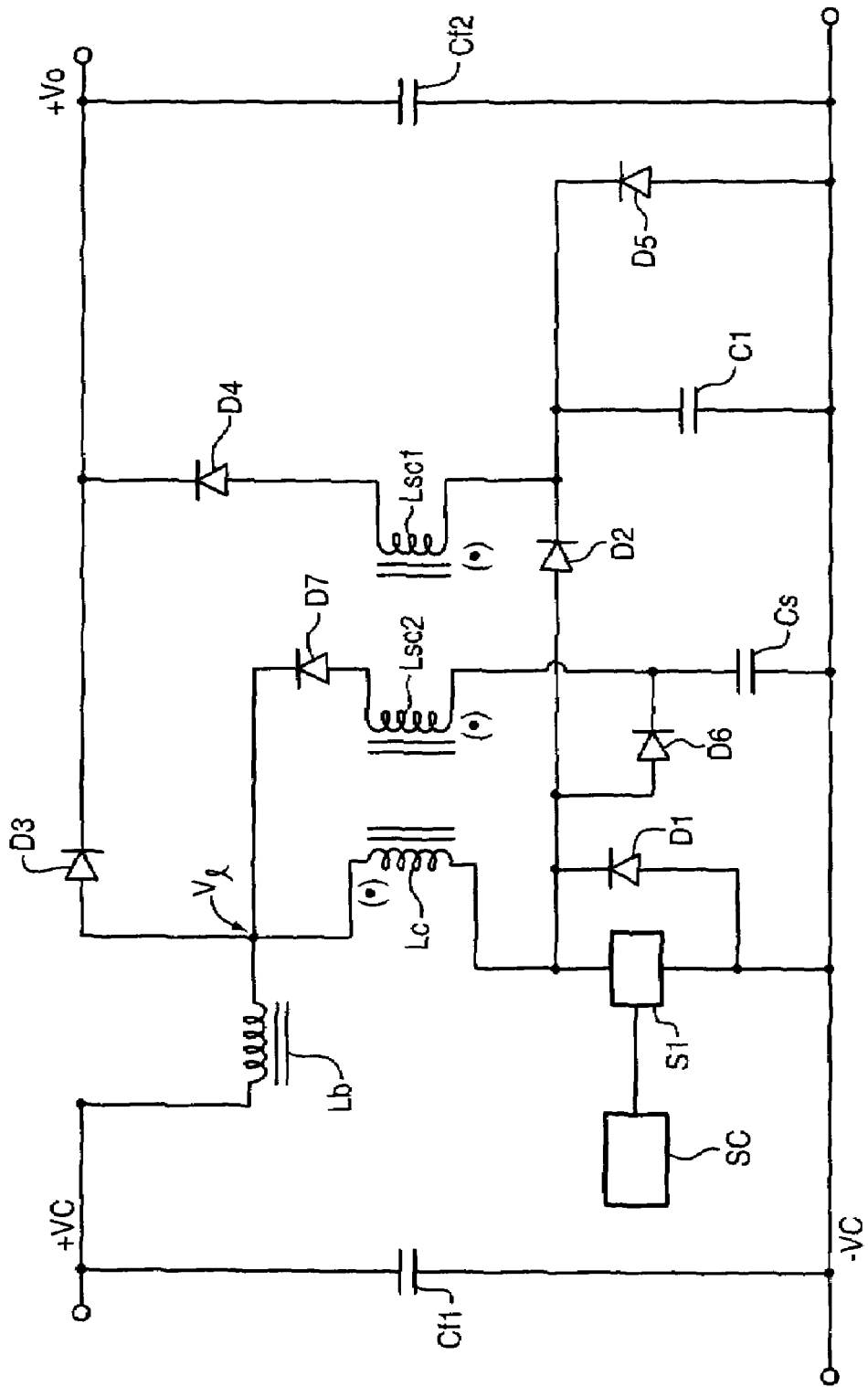
FIG. 16 illustrates a boost converter using the circuit arrangements of the switch mode power converter having multiple inductor windings equipped with snubber circuits.

The following describes an application of FIG. 15, for example, to a boost converter. This is shown in FIG. 16. The capacitors Cf1 and Cf2 are the input and the output filter capacitors, respectively. The diode D3 is the primary boost fly-back diode, and the inductor Lb is the primary boost inductor. Based on this circuit, a 300 W boost converter with 200V DC input and 450V DC output was built. The converter operating frequency was chosen to be 120 kHz. The snubber capacitor Cs1 value was 470 pF. The value of Lc~3 uH with 5 turns and the value of Lsc1=Lsc2~8 uH with 8 turns. When compared with the conventional RCD snubber circuit of FIG. 5A, a savings of ~6 W was realized. This 6 W savings may not appear significant until one recognizes that a resistor that dissipates 6 W may cause serious temperature problems within a sealed device enclosure.

Figure 17:
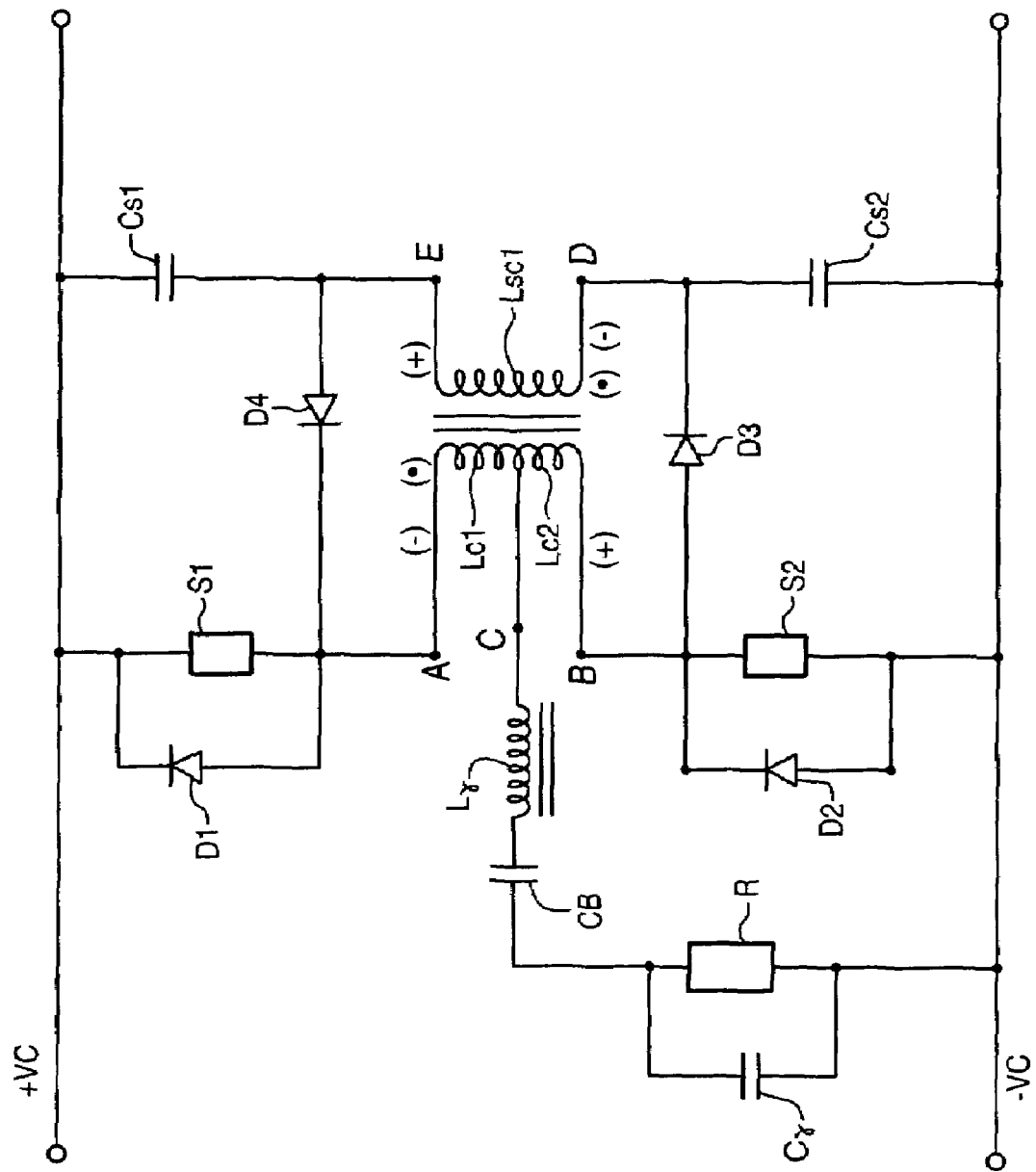
FIG. 17 is a variation of the circuit arrangement of the switch mode power converter having multiple inductor windings equipped with snubber circuits shown in FIG. 7A.
Figure 18:
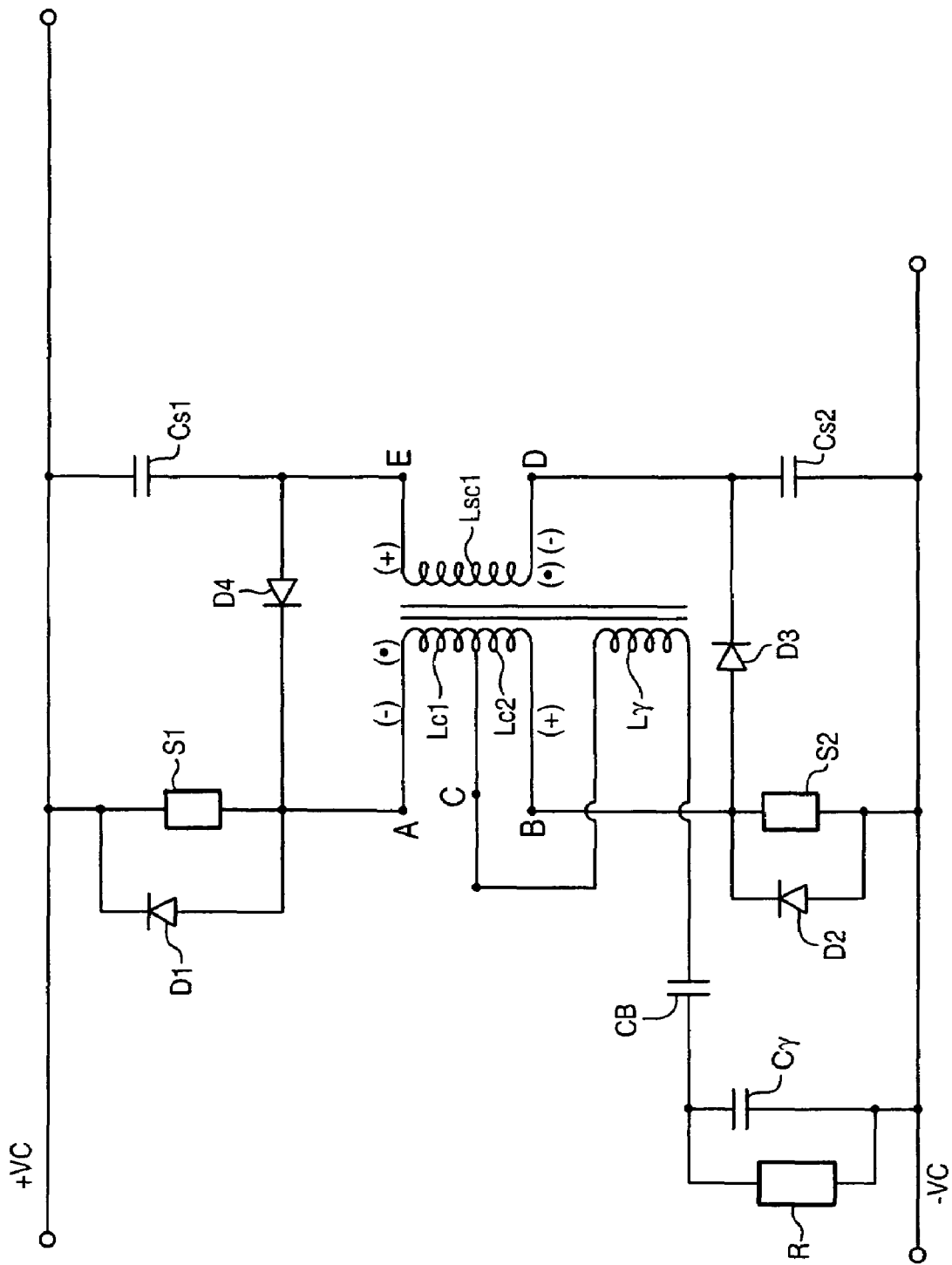
FIG. 18 is a variation of the circuit arrangement of the switch mode power converter having multiple inductor windings equipped with snubber circuits shown in FIG. 17.

Further, in the above descriptions, the primary inductors and snubber inductors are wound on separate cores. However, in certain applications it may be possible to wind the snubber inductor on the primary inductor. As an example, one such arrangement is described as follows. FIG. 17 is a variation of FIG. 7A. The inductor $L_\gamma$ and the capacitor $C_\gamma$ form a resonant tank circuit. The load R, such as a fluorescent lamp, is connected across capacitor $C_\gamma$. Therefore, depending on the load characteristics, the snubber inductor Lc may be wound on the core of inductor $L_\gamma$. This is shown in FIG. 18 where corresponding $L_\gamma$, Lc1, Lc2, and Lsc1 inductor sections are wound on a single core C. The windings Lc1 and Lc2 are the primary windings, and the winding Lsc1 is the secondary winding of the snubber inductor. Similarly, following the same analogy and depending on the load and circuit characteristics, the snubber inductor Lc and the secondary windings Lsc1-Lsc2 in FIG. 16 may also be wound on the core of Lb.

SUMMARY

The present switch mode power converter having multiple inductor windings equipped with snubber circuits uses a small value inductor that has at least one properly oriented secondary winding, and ultra fast diodes interconnect the primary and the secondary windings of this inductor for providing protection against momentary short circuits, reductions of dv/dt, and switching losses.

What is claimed as new and desired to be protected by Letters Patent of the United States is:

1. A switch mode power converter with a snubber circuit for powering a load from a source of DC voltage having first and second terminals, comprising:

snubber inductor means having a low inductance primary winding with a first terminal, a second terminal, and a center tap terminal that is connected in series to a first terminal of a load, wherein a second terminal of said load is connected to a second terminal of said source of DC voltage, and said snubber inductor means has a first polarity between said first and said second terminals of said primary winding;

first switch means, connected between a first terminal of said source of DC voltage and said first terminal of said primary winding of said snubber inductor means;

first commutating diode means having an anode terminal and a cathode terminal, said cathode terminal being connected to said first terminal of said source of DC voltage and said anode terminal being connected to said first terminal of said primary winding of said snubber inductor means;

second switch means, connected between a second terminal of said source of DC voltage and said second terminal of said primary winding of said snubber inductor means;

second commutating diode means having an anode terminal and a cathode terminal, said anode terminal being connected to said second terminal of said source of DC voltage and said cathode terminal being connected to said second terminal of said primary winding of said snubber inductor means;

switching control means for switching the first and second switch means to conduct alternatively between said first and second terminals of said source of DC voltage at a predetermined high frequency;

wherein said snubber inductor means includes a secondary winding with first and second terminals and a second polarity between said first and said second terminals of said secondary winding that is opposite said first polarity of said primary winding of said snubber inductor means and said secondary winding of said snubber inductor means is connected between said first and second terminals of said source of DC voltage, respectively to conduct transient currents around said load.

2. The switch mode power converter with a snubber of claim 1 further comprising:

first snubber capacitor means having first and second terminals, said first terminal being connected to said first terminal of said source of DC voltage and said second terminal being connected to said first terminal of said secondary winding of said snubber inductor means.

3. The switch mode power converter with a snubber of claim 2 further comprising:

third diode means having an anode terminal and a cathode terminal, said anode terminal being connected to said second terminal of said source of DC voltage and said cathode terminal being connected to said second terminal of said secondary winding of said snubber inductor means.

4. The switch mode power converter with a snubber of claim 2 further comprising:

second snubber capacitor means having a first and second terminals, said first terminal being connected to said second terminal of said secondary winding of said snubber inductor means and said second terminal being connected to said second terminal of said source of DC voltage.

5. The switch mode power converter with a snubber of claim 2 further comprising:

first clamping diode means having an anode terminal and a cathode terminal, said anode terminal being connected to said first terminal of said secondary winding of said snubber inductor means and said cathode terminal being connected to said first terminal of said primary winding of said snubber inductor means.

6. The switch mode power converter with a snubber of claim 5 further comprising:
second clamping diode means having an anode terminal and a cathode terminal, said anode terminal being connected to said first terminal of said secondary winding of said snubber inductor means and said cathode terminal being connected to said first terminal of said source of DC voltage.

7. The switch mode power converter with a snubber of claim 2 further comprising:
wherein said snubber inductor means includes a tertiary winding with first and second terminals and a third polarity between said first and said second terminals that is opposite said first polarity of said primary winding of said snubber inductor means and said tertiary winding is connected between said first and second terminals of said source of DC voltage, respectively.

8. The switch mode power converter with a snubber of claim 7 further comprising:
second snubber capacitor means having a first and second terminals, said first terminal being connected to said second terminal of said tertiary winding of said snubber inductor means and said second terminal being connected to said second terminal of said source of DC voltage.

9. The switch mode power converter with a snubber of claim 7 further comprising:
third diode means having an anode terminal and a cathode terminal, said anode terminal being connected to said first terminal of said tertiary winding of said snubber inductor means and said cathode terminal being connected to said second terminal of said source of DC voltage.

10. The switch mode power converter with a snubber of claim 7 further comprising:
linking diode means having an anode terminal and a cathode terminal, said anode terminal being connected to said second terminal of said primary winding of said snubber inductor means and said cathode terminal being connected to said second terminal of said tertiary winding of said snubber inductor means.

11. The switch mode power converter with a snubber of claim 1 further comprising:
first snubber means connected between a first terminal of said source of DC voltage and said first terminal of said snubber inductor means; and
second snubber means connected between a second terminal of said source of DC voltage and said second terminal of said snubber inductor means.

12. The switch mode power converter with a snubber of claim 11 further comprising:
wherein said first snubber means comprises:
resistor means connected in parallel with snubber diode means having and anode terminal and a cathode terminal,
snubber capacitor means having first and second terminals, said first terminal being connected to said cathode terminal of said snubber diode means, and
wherein said anode terminal of said snubber diode means is connected to said first terminal of said source of DC voltage and said second terminal of said snubber capacitor means is connected to said first terminal of said snubber inductor means.

13. The switch mode power converter with a snubber of claim 11 further comprising:
wherein said second snubber means comprises:
resistor means connected in parallel with snubber diode means having and anode terminal and a cathode terminal,
snubber capacitor means having first and second terminals, said first terminal being connected to said cathode terminal of said snubber diode means, and
wherein said anode terminal of said snubber diode means is connected to said second terminal of said snubber inductor means and said first terminal of said snubber capacitor means is connected to said second terminal of said source of DC voltage.

14. The switch mode power converter with a snubber of claim 11 further comprising:
wherein said first snubber means comprises:
snubber diode means having and anode terminal and a cathode terminal,
snubber capacitor means having first and second terminals, said first terminal being connected to said cathode terminal of said snubber diode means, and
wherein said anode terminal of said snubber diode means is connected to said first terminal of said source of DC voltage and said second terminal of said snubber capacitor means is connected to said first terminal of said snubber inductor means.

15. The switch mode power converter with a snubber of claim 11 further comprising:
wherein said second snubber means comprises:
snubber diode means having and anode terminal and a cathode terminal,
snubber capacitor means having first and second terminals, said first terminal being connected to said cathode terminal of said snubber diode means, and
wherein said anode terminal of said snubber diode means is connected to said second terminal of said snubber inductor means and said first terminal of said snubber capacitor means is connected to said second terminal of said source of DC voltage.

16. The switch mode power converter with a snubber of claim 7 further comprising:
wherein said inductor means includes a fourth winding with first and second terminals and a fourth polarity between said first and said second terminals that is opposite said first polarity of said primary winding of said snubber inductor means and said fourth winding is connected between said first and second terminals of said source of DC voltage, respectively.

17. The switch mode power converter with a snubber of claim 16 further comprising:
first fourth winding capacitor means having a first and second terminals, said first terminal being connected to said first terminal of said source of DC voltage and said second terminal being connected to first terminal of said fourth winding of said snubber inductor means; and
second fourth winding capacitor means having a first and second terminals, said first terminal being connected to said second terminal of said fourth winding of said snubber inductor means and said second terminal being connected to said second terminal of said source of DC voltage.

18. The switch mode power converter with a snubber of claim 16 further comprising:
third clamping diode means having an anode terminal and a cathode terminal, said anode terminal being connected to said first terminal of said fourth winding of said snubber inductor means and said cathode terminal being connected to said first terminal of said primary winding of said snubber inductor means; and fourth clamping diode means having an anode terminal and a cathode terminal, said cathode terminal being connected to said second terminal of said fourth winding of said snubber inductor means and said anode terminal being connected to said second terminal of said primary winding of said snubber inductor means.

19. The switch mode power converter with a snubber of claim 2 further comprising:

first linking diode means having an anode terminal and a cathode terminal, said anode terminal being connected to said first terminal of said secondary winding of said snubber inductor means and said cathode terminal being connected to said first terminal of said primary winding of said snubber inductor means; and second linking diode means having an anode terminal and a cathode terminal, said anode terminal being connected to said second terminal of said primary winding of said snubber inductor means and said cathode terminal being connected to said second terminal of said secondary winding of said snubber inductor means.

20. The switch mode power converter with a snubber of claim 19 further comprising:

second capacitor means having a first and second terminals, said first terminal being connected to said second terminal of said secondary winding of said snubber inductor means and said second terminal being connected to said second terminal of said source of DC voltage.

21. The switch mode power converter with a snubber of claim 19 further comprising:

third capacitor means having a first and second terminals, said first terminal being connected to said second terminal of said secondary winding of said snubber inductor means and said second terminal being connected to said first terminal of said source of DC voltage.

22. The switch mode power converter with a snubber of claim 4 further comprising:

first commutation current diode means having an anode terminal and a cathode terminal, said anode terminal being connected to said second terminal of said primary winding of said snubber inductor means and said cathode terminal being connected to said second terminal of said source of DC voltage; and second commutation current diode means having an anode terminal and a cathode terminal, said anode terminal being connected to said second terminal of said source of DC voltage and said cathode terminal being connected to said first terminal of said primary winding of said snubber inductor means.

23. The switch mode power converter with a snubber of claim 1 further comprising:

snubber circuit means connected between said load and said center tap terminal of said snubber inductor means.

24. The switch mode power converter with a snubber of claim 23 wherein said snubber circuit means comprises:

snubber inductor means having first and second terminals, said first terminal being connected to said center tap terminal; and capacitor means having first and second terminals, said first terminal being connected to said second terminal of said snubber inductor means and said second terminal being connected to said load.

* * * * *